United States Patent
Snider et al.

(10) Patent No.: US 12,421,856 B2
(45) Date of Patent: Sep. 23, 2025

(54) DAMPER ELEMENT WITH FLEXIBLE LEGS FOR VIBRATION DAMPENING SYSTEM FOR TURBINE BLADE

(71) Applicant: GE Infrastructure Technology LLC, Greenville, SC (US)

(72) Inventors: Zachary John Snider, Pelzer, SC (US); John McConnell Delvaux, Fountain Inn, SC (US)

(73) Assignee: GE Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 18/343,966

(22) Filed: Jun. 29, 2023

(65) Prior Publication Data

US 2025/0003343 A1    Jan. 2, 2025

(51) Int. Cl.
*F01D 5/26*    (2006.01)

(52) U.S. Cl.
CPC ............ *F01D 5/26* (2013.01); *F05D 2260/96* (2013.01)

(58) Field of Classification Search
None
See application file for complete search history.

(56) References Cited

U.S. PATENT DOCUMENTS

| | | | |
|---|---|---|---|
| 4,475,722 A | 10/1984 | Paton et al. | |
| 4,738,437 A * | 4/1988 | Paton | B60G 15/10 188/129 |
| 5,568,749 A * | 10/1996 | Liposky | F16F 13/02 74/513 |
| 5,820,343 A | 10/1998 | Kraft et al. | |
| 6,283,707 B1 * | 9/2001 | Chin | F01D 5/16 416/500 |

(Continued)

FOREIGN PATENT DOCUMENTS

| | | |
|---|---|---|
| CN | 108561487 A | 9/2018 |
| GB | 2071775 A | 9/1981 |

(Continued)

OTHER PUBLICATIONS

Extended European Search Report from European Patent Application No. 24180137.2 dated Sep. 16, 2024, 10 pages.

(Continued)

*Primary Examiner* — Kayla Mccaffrey
(74) *Attorney, Agent, or Firm* — Charlotte Wilson; James Pemrick; Hoffman Warnick LLC

(57) ABSTRACT

A damper element and a vibration dampening system including a plurality of the stacked damper elements, are provided. The damper element(s) may be used in a body opening in a rotating blade in a turbine. The damper elements include a head member having an at least partially ramped surface, an opening defined through a center of the head member, and a plurality of flexible legs extending from the head member. Each flexible leg includes a radially extending body section having an end section, which has an outer end surface and an inner end surface. An elongated body extends through the opening in the head member. Centrifugal force causes the head member of adjacent damper elements to force the outer end surfaces of the flexible legs into frictional engagement with an inner surface of the body opening to dampen vibration.

21 Claims, 17 Drawing Sheets

(56) References Cited

U.S. PATENT DOCUMENTS

| | | | |
|---|---|---|---|
| 8,292,583 B2 * | 10/2012 | Marra | F01D 5/3007 416/193 A |
| 8,915,718 B2 | 12/2014 | Dolansky et al. | |
| 9,267,380 B2 | 2/2016 | Houston et al. | |
| 9,657,717 B2 | 5/2017 | Ollgaard et al. | |
| 10,151,204 B2 * | 12/2018 | Houston | F01D 9/041 |
| 10,808,788 B2 | 10/2020 | Seeley et al. | |
| 11,187,089 B2 | 11/2021 | Wondrasek et al. | |
| 11,371,358 B2 | 6/2022 | Chakrabarti et al. | |
| 11,473,431 B2 | 10/2022 | Greenberg et al. | |
| 11,976,565 B2 | 5/2024 | Snider et al. | |
| 2005/0200062 A1 | 9/2005 | Maurer et al. | |
| 2006/0280606 A1 | 12/2006 | Busbey et al. | |
| 2010/0253114 A1 | 10/2010 | Ohmiya et al. | |
| 2013/0276457 A1 | 10/2013 | Houston et al. | |
| 2013/0280045 A1 | 10/2013 | Dolansky et al. | |
| 2018/0291976 A1 | 10/2018 | Seeley et al. | |
| 2020/0291794 A1 | 9/2020 | Greenberg et al. | |
| 2021/0172325 A1 | 6/2021 | Wondrasek et al. | |
| 2024/0035384 A1 | 2/2024 | Snider et al. | |

FOREIGN PATENT DOCUMENTS

| | | |
|---|---|---|
| JP | S59150904 A | 8/1984 |
| JP | 2006143087 A | 6/2006 |
| JP | 2007137288 A | 6/2007 |
| JP | 2014084676 A | 5/2014 |

OTHER PUBLICATIONS

Extended European Search Report from European Patent Application No. 24180121.6 dated Sep. 16, 2024, 9 pages.

Non-Final Office Action in U.S. Appl. No. 18/343,953, mailed Jun. 20, 2024, 31 pages.

Final Office Action in U.S. Appl. No. 18/343,953, mailed Nov. 4, 2024, 15 pages.

Notice of Allowance and Fees Due dated Feb. 5, 2025 for U.S. Appl. No. 18/343,953, 5 pages.

* cited by examiner

DAMPER ELEMENT WITH FLEXIBLE LEGS FOR VIBRATION DAMPENING SYSTEM FOR TURBINE BLADE

TECHNICAL FIELD

The disclosure relates generally to dampening vibration in a rotating blade. More specifically, the disclosure relates to a vibration dampening system including a plurality of damper elements each having a plurality of flexible legs.

BACKGROUND

One concern in turbine operation is the tendency of the rotating turbine blades to undergo vibrational stress during operation. In many installations, turbines are operated under conditions of frequent acceleration and deceleration. During acceleration or deceleration of the turbine, the airfoils of the blades are, momentarily at least, subjected to vibrational stresses at certain frequencies and in many cases to vibrational stresses at secondary or tertiary frequencies. Nozzle airfoils experience similar vibrational stress. Variations in gas temperature, pressure, and/or density, for example, can excite vibrations throughout the rotor assembly, especially within the blade airfoils. Gas exiting upstream of the turbine and/or compressor sections in a periodic, or "pulsating," manner can also excite undesirable vibrations. When an airfoil is subjected to vibrational stress, its amplitude of vibration can readily build up to a point which may negatively affect gas turbine operations and/or component life. Stacked, solid damper elements in a turbine blade have been used to dampen vibration, but the centrifugal forces can result in locking of the damper elements together, reducing or eliminating their ability to dampen vibration.

BRIEF DESCRIPTION

All aspects, examples and features mentioned below can be combined in any technically possible way.

An aspect of the disclosure provides a damper element for a vibration dampening system in a body opening in a rotating blade in a turbine, the damper element comprising: a head member having an at least partially ramped surface; and a plurality of flexible legs extending from the head member, wherein each flexible leg includes a radially extending body section having an end section, the end section having an outer end surface and an inner end surface.

Another aspect of the disclosure includes any of the preceding aspects, and the at least partially ramped surface has an angle in a range between 25° and 55° degrees relative to an inner surface of the body opening, and the inner end surfaces of the plurality of flexible legs have an angle in a range between 25° and 55° degrees relative to the inner surface of the body opening.

Another aspect of the disclosure includes any of the preceding aspects, and the head member and, collectively, the radially extending body section of the plurality of flexible legs each have a first outer diameter, and the outer end surfaces of the plurality of flexible legs collectively define a second outer diameter that is larger than the first outer diameter.

Another aspect of the disclosure includes any of the preceding aspects, and the body opening has an inner surface having a third inner diameter, and wherein the second outer diameter is smaller than the third inner diameter, whereby, in a relaxed state, the plurality of flexible legs pass freely within the body opening.

Another aspect of the disclosure includes any of the preceding aspects, and the inner end surfaces of the plurality of flexible legs are configured to receive the at least partially ramped surface of the head member of an adjacent damper element, wherein under influence of a centrifugal force caused by rotation of the rotating blade at higher than a predefined rotational speed, the head member of the adjacent damper element forces the outer end surfaces of the plurality of flexible legs into frictional engagement with an inner surface of the body opening to dampen vibration.

Another aspect of the disclosure includes any of the preceding aspects, and the outer end surfaces of each flexible leg frictionally engage with the inner surface of the body opening at a line.

Another aspect of the disclosure includes any of the preceding aspects, and the outer end surfaces of each flexible leg are parallel to the inner surface of the body opening in a relaxed state of the plurality of flexible legs.

Another aspect of the disclosure includes any of the preceding aspects, and adjacent radially extending body sections of the flexible legs defined a slot therebetween having a rounded radially outer extent.

Another aspect of the disclosure includes any of the preceding aspects, and the head member having the at least partially ramped surface has a frustoconical shape.

An aspect of the disclosure includes a vibration dampening system for a rotating blade, the vibration dampening system comprising: a plurality of stacked damper elements for positioning in a body opening defined in the rotating blade, each damper element including: a head member having an at least partially ramped surface; and a plurality of flexible legs extending from the head member, wherein each flexible leg includes a radially extending body section having an end section, the end section having an outer end surface and an inner end surface.

Another aspect of the disclosure includes any of the preceding aspects, and the at least partially ramped surface of each damper element has an angle in a range between 25° and 55° degrees relative to an inner surface of the body opening, and the inner end surfaces of the plurality of flexible legs have an angle in a range between 25° and 55° degrees relative to the inner surface of the body opening.

Another aspect of the disclosure includes any of the preceding aspects, and the head member and, collectively, the radially extending body section of the plurality of flexible legs of each damper element each have a first outer diameter, and the outer end surfaces of the plurality of flexible legs of each damper element collectively define a second outer diameter that is larger than the first outer diameter.

Another aspect of the disclosure includes any of the preceding aspects, and the body opening has an inner surface having a third inner diameter, and wherein the second outer diameter is smaller than the third inner diameter, whereby, in a relaxed state, the plurality of flexible legs of each damper element pass freely within the body opening.

Another aspect of the disclosure includes any of the preceding aspects, and the inner end surfaces of the plurality of flexible legs of each damper element are configured to receive the at least partially ramped surface of the head member of an adjacent damper element of the plurality of stacked damper elements, wherein under influence of a centrifugal force caused by rotation of the rotating blade at higher than a predefined rotational speed, the head member of the adjacent damper element forces the outer end surfaces of the plurality of flexible legs into frictional engagement with an inner surface of the body opening to dampen vibration.

Another aspect of the disclosure includes any of the preceding aspects, and the outer end surfaces of each flexible leg frictionally engage with the inner surface of the body opening at a line.

Another aspect of the disclosure includes any of the preceding aspects, and adjacent radially extending body sections of the plurality of flexible legs of each damper element define a slot therebetween having a rounded radially outer extent.

Another aspect of the disclosure includes any of the preceding aspects, and the plurality of flexible legs extend radially inward from a respective head member of each of the plurality of damper elements, and further comprising a radially inner end element having a head member having an at least partially ramped surface configured to engage the inner end surfaces of the plurality of flexible legs of a radially innermost one of the plurality of stacked damper elements.

Another aspect of the disclosure includes any of the preceding aspects, and the plurality of flexible legs extend radially outward from a respective head member of each of the plurality of damper elements, and further comprising a radially outer end element configured to engage the plurality of flexible legs of a radially outermost one of the plurality of stacked damper elements.

Another aspect of the disclosure includes any of the preceding aspects, and the plurality of damper elements have at least one of the following characteristics different between at least two damper elements: overall mass, overall radial length, radial length of the plurality of flexible legs, a force required to flex the plurality of flexible legs outwardly, a shape of the inner end surfaces, a shape of the outer end surfaces, an angle of the at least partially ramped surfaces.

Another aspect of the disclosure includes any of the preceding aspects, and the head member of each damper element has the at least partially ramped surface having a frustoconical shape.

An aspect of the disclosure includes a damper element for a vibration dampening system in a body opening in a rotating blade in a turbine, the damper element comprising: a head member having an at least partially ramped surface and an opening defined through a center of the head member; a plurality of flexible legs extending from the head member, wherein each flexible leg includes a radially extending body section having an end section, the end section having an outer end surface and an inner end surface; and an elongated body extending through the opening in the head member.

Another aspect of the disclosure includes any of the preceding aspects, and the elongated body is configured to resonate at a same frequency as the rotating blade, whereby the elongated body generates a force against the damper element.

Another aspect of the disclosure includes any of the preceding aspects, and the at least partially ramped surface has an angle in a range between 25° and 55° degrees relative to an inner surface of the body opening, and the inner end surfaces of the plurality of flexible legs have an angle in a range between 25° and 55° degrees relative to the inner surface of the body opening.

Another aspect of the disclosure includes any of the preceding aspects, and the head member and, collectively, the radially extending body section of the plurality of flexible legs each have a first outer diameter, and the outer end surfaces of the plurality of flexible legs collectively define a second outer diameter that is larger than the first outer diameter.

Another aspect of the disclosure includes any of the preceding aspects, and the body opening has an inner surface having a third inner diameter, and wherein the second outer diameter is smaller than the third inner diameter, whereby, in a relaxed state, the plurality of flexible legs pass freely within the body opening.

Another aspect of the disclosure includes any of the preceding aspects, and the inner end surfaces of the plurality of flexible legs are configured to receive the at least partially ramped surface of the head member of an adjacent damper element, wherein under influence of a centrifugal force caused by rotation of the rotating blade at higher than a predefined rotational speed, the head member of the adjacent damper element forces the outer end surfaces of the plurality of flexible legs into frictional engagement with an inner surface of the body opening to dampen vibration.

Another aspect of the disclosure includes any of the preceding aspects, and the outer end surfaces of each flexible leg frictionally engage with the inner surface of the body opening at a line.

Another aspect of the disclosure includes any of the preceding aspects, and adjacent radially extending body sections of the plurality of flexible legs define a slot therebetween having a rounded radially outer extent.

Another aspect of the disclosure includes any of the preceding aspects, and the head member of each damper element has the at least partially ramped surface having a frustoconical shape through which the opening extends.

An aspect of the disclosure includes a vibration dampening system for a rotating blade, the vibration dampening system comprising: a plurality of stacked damper elements for positioning in a body opening defined in the rotating blade, each damper element including: a head member having an at least partially ramped surface and an opening defined through a center of the head member; a plurality of flexible legs extending from the head member, wherein each flexible leg includes a radially extending body section having an end section, the end section having an outer end surface and an inner end surface; and an elongated body extending through the opening in the head member of each of the plurality of damper elements.

Another aspect of the disclosure includes any of the preceding aspects, and the at least partially ramped surface of each damper element has an angle in a range between 25° and 55° degrees relative to an inner surface of the body opening, and the inner end surfaces of the plurality of flexible legs have an angle in a range between 25° and 55° degrees relative to the inner surface of the body opening.

Another aspect of the disclosure includes any of the preceding aspects, and the head member and, collectively, the radially extending body section of the plurality of flexible legs of each damper element each have a first outer diameter, and the outer end surfaces of the plurality of flexible legs of each damper element collectively define a second outer diameter that is larger than the first outer diameter.

Another aspect of the disclosure includes any of the preceding aspects, and the body opening has an inner surface having a third inner diameter, and wherein the second outer diameter is smaller than the third inner diameter, whereby, in a relaxed state, the plurality of flexible legs of each damper element pass freely within the body opening.

Another aspect of the disclosure includes any of the preceding aspects, and the inner end surfaces of the plurality of flexible legs of each damper element are configured to receive the at least partially ramped surface of the head member of an adjacent damper element of the plurality of stacked damper elements, wherein under influence of a centrifugal force caused by rotation of the rotating blade at higher than a predefined rotational speed, the head member of the adjacent damper element forces the outer end surfaces of the plurality of flexible legs into frictional engagement with an inner surface of the body opening to dampen vibration.

Another aspect of the disclosure includes any of the preceding aspects, and the outer end surfaces of each flexible leg frictionally engage with the inner surface of the body opening at a line.

Another aspect of the disclosure includes any of the preceding aspects, and adjacent radially extending body sections of the plurality of flexible legs of each damper element define a slot therebetween having a rounded radially outer extent.

Another aspect of the disclosure includes any of the preceding aspects, and further comprising a radially outer retainer element fixed to the elongated body to retain the plurality of stacked damper elements on the elongated body.

Another aspect of the disclosure includes any of the preceding aspects, and the plurality of flexible legs extend radially inward from a respective head member of each of the plurality of damper elements, and further comprising a radially inner end element having: a head member having an at least partially ramped surface configured to engage the inner end surfaces of the plurality of flexible legs of a radially innermost one of the plurality of stacked damper elements, and an opening through the radially inner end element through which the elongated body extends, wherein the radially inner end element is slidable on the elongated body.

Another aspect of the disclosure includes any of the preceding aspects, and the plurality of flexible legs extend radially outward from a respective head member of each of the plurality of damper elements, and further comprising a radially inner end element configured to engage the head member of a radially innermost one of the plurality of stacked damper elements, the radially inner end element including an opening through which the elongated body extends, wherein the radially inner end element is slidable on the elongated body.

Another aspect of the disclosure includes any of the preceding aspects, and the plurality of damper elements have at least one of the following characteristics different between at least two damper elements: overall mass, overall radial length, radial length of the plurality of flexible legs, a force required to flex the plurality of flexible legs outwardly, a shape of the inner end surfaces, a shape of the outer end surfaces, an angle of the at least partially ramped surfaces.

Another aspect of the disclosure includes any of the preceding aspects, and the head member of each damper element has the at least partially ramped surface having a frustoconical shape through which the opening extends.

Two or more aspects described in this disclosure, including those described in this summary section, may be combined to form implementations not specifically described herein. That is, all embodiments described herein can be combined with each other.

The details of one or more implementations are set forth in the accompanying drawings and the description below. Other features, objects and advantages will be apparent from the description and drawings, and from the claims.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
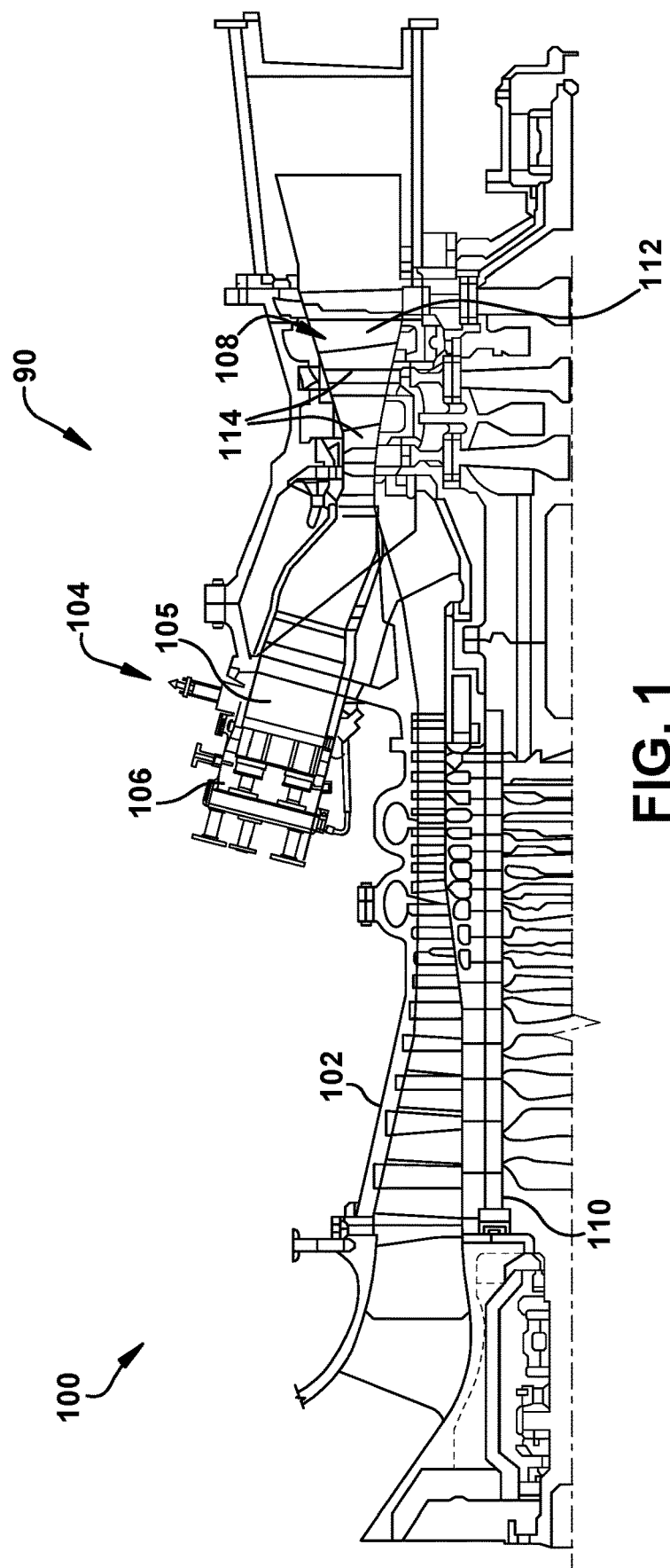
FIG. 1 shows a cross-sectional view of an illustrative turbomachine in the form of a gas turbine system including a turbine.

It is noted that the drawings of the disclosure are not necessarily to scale. The drawings are intended to depict only typical aspects of the disclosure and therefore should not be considered as limiting the scope of the disclosure. In the drawings, like numbering represents like elements between the drawings.

DETAILED DESCRIPTION

As an initial matter, in order to clearly describe the subject matter of the current disclosure, it will become necessary to select certain terminology when referring to and describing relevant machine components within a turbine. To the extent possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. It is often required to describe parts that are disposed at different radial positions with regard to a center axis. The term "radial" refers to movement or position perpendicular to an axis. For example, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. The term "axial" refers to movement or position parallel to an axis. Finally, the term "circumferential" refers to movement or position around an axis. It will be appreciated that such terms may be applied in relation to a center axis of a damper element or the center axis of the turbine.

In addition, several descriptive terms may be used regularly herein, as described below. The terms "first," "second," and "third," may be used interchangeably to distinguish one component from another and are not intended to signify location or importance of the individual components.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components but do not preclude the presence or addition of one or more other features, integers, steps, operations, elements, components, and/or groups thereof. "Optional" or "optionally" means that the subsequently described event or circumstance may or may not occur or that the subsequently described component or element may or may not be present, and that the description includes instances where the event occurs or the component is present and instances where it does not or is not present.

Where an element or layer is referred to as being "on," "engaged to," "connected to" or "coupled to" another element or layer, it may be directly on, engaged to, connected to, or coupled to the other element or layer, or intervening elements or layers may be present. In contrast, when an element is referred to as being "directly on," "directly engaged to," "directly connected to" or "directly coupled to" another element or layer, there are no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Embodiments of the disclosure provide a damper element and a vibration dampening system for a turbine blade. The vibration dampening system includes a plurality of the stacked damper elements. The damper element(s) for the vibration dampening system may be used in a body opening in a rotating blade in a turbine. The damper elements include a head member having an at least partially ramped surface, and a plurality of flexible legs extending from the head member. Each flexible leg includes a radially extending body section having an end section, and the end section has an outer end surface and an inner end surface. Under influence of a centrifugal force caused by rotation of the rotating blade at higher than a predefined rotational speed, the head member of an adjacent damper element forces the outer end surfaces of the plurality of flexible legs of a damper element into frictional engagement with an inner surface of the body opening to dampen vibration. In certain embodiments, an elongated body may extend through an opening in the head member of the damper element(s).

The damper element(s) according to embodiments of the disclosure are more likely to capture relative motion, compared to other stacked damper pins, because it is forced to expand and touch the inner surface of the body opening in the rotating blade. This arrangement is advantageous because it allows the damper element to move with the inner surface of the body opening in the rotating blade immediately, i.e., when centrifugal forces may not expand the flexible legs, and the sliding movement from unloaded flexible legs to loaded, flexed legs creates a stick-slip motion that is effective for vibration dampening. The vibration dampening system reduces blade vibration with a simple arrangement and does not add much extra mass to the blade. Accordingly, the vibration dampening system and damper elements do not increase overall centrifugal force to the blade tip end or require a change in blade configuration.

Referring to the drawings, FIG. 1 is a cross-sectional view of an illustrative machine including a turbine(s) to which teachings of the disclosure can be applied. In FIG. 1, a turbomachine 90 in the form of a combustion turbine or gas turbine (GT) system 100 (hereinafter, "GT system 100") is shown. GT system 100 includes a compressor 102 and a combustor 104. Combustor 104 includes a combustion region 105 and a fuel nozzle section 106. GT system 100 also includes a turbine 108 and a common compressor/turbine shaft 110 (hereinafter referred to as "rotor 110").

GT system 100 may be, for example, a 7HA.03 engine, commercially available from General Electric Company, Greenville, S.C. The present disclosure is not limited to any one particular GT system and may be implemented in connection with other engines including, for example, the other HA, F, B, LM, GT, TM and E-class engine models of General Electric Company and engine models of other companies. More importantly, the teachings of the disclosure are not necessarily applicable to only a turbine in a GT system and may be applied to practically any type of industrial machine or other turbine, e.g., steam turbines, jet engines, compressors (as in FIG. 1), turbofans, turbochargers, etc. Hence, reference to turbine 108 of GT system 100 is merely for descriptive purposes and is not limiting.

Figure 2:
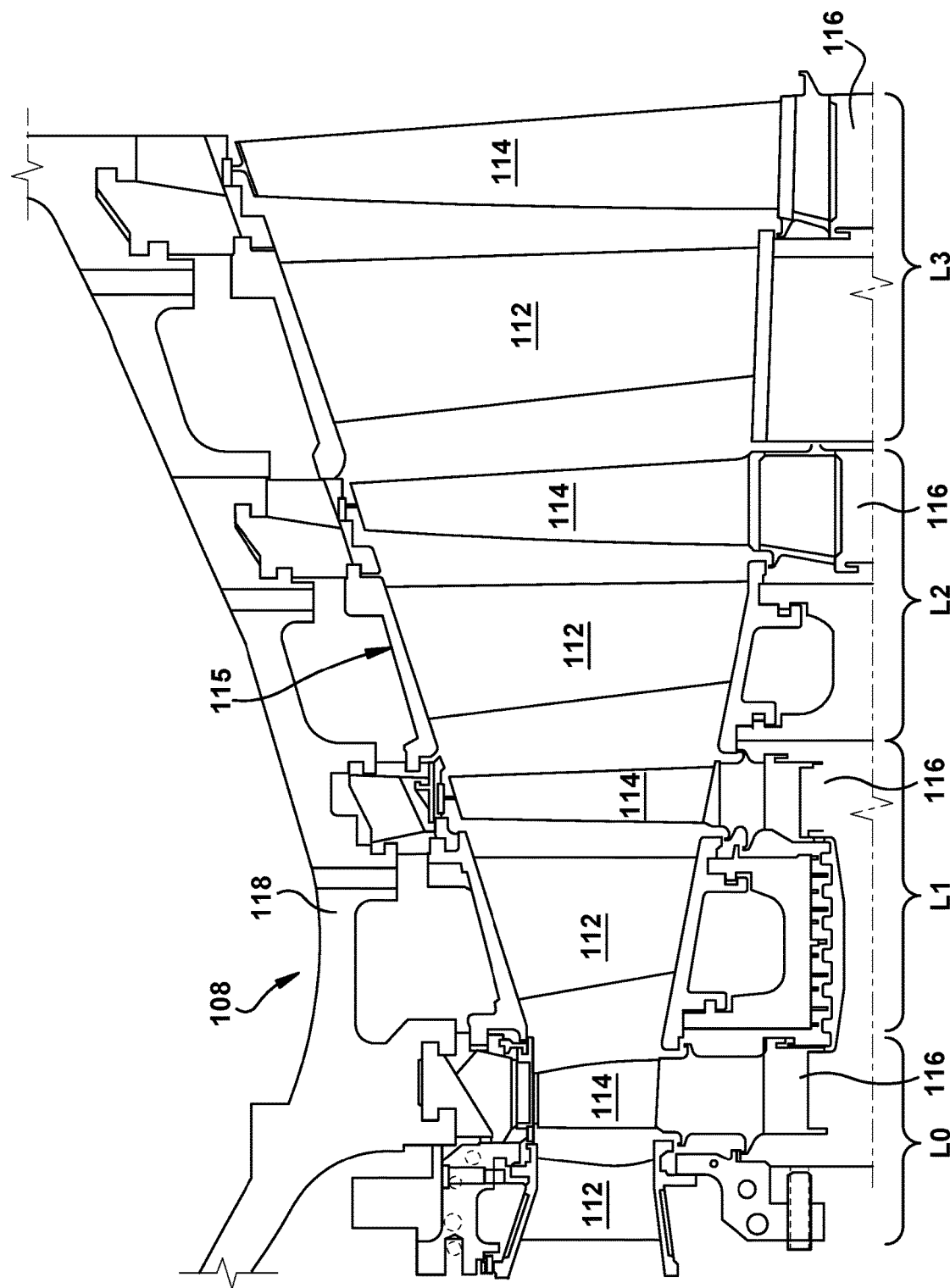
FIG. 2 shows a cross-sectional view of a portion of an illustrative turbine, according to embodiments of the disclosure.

FIG. 2 shows a cross-sectional view of an illustrative portion of turbine 108. In the example shown, turbine 108 includes four stages L0-L3 that may be used with GT system 100 in FIG. 1. The four stages are referred to as L0, L1, L2, and L3. Stage L0 is the first stage and is the smallest (in a radial direction) of the four stages. Stage L1 is the second stage and is disposed adjacent the first stage L0 in an axial direction. Stage L2 is the third stage and is disposed adjacent the second stage L1 in an axial direction. Stage L3 is the fourth, last stage and is the largest (in a radial direction). It is to be understood that four stages are shown as one example only, and each turbine may have more or less than four stages.

A plurality of stationary turbine vanes or nozzles 112 (hereafter "nozzle 112," or "nozzles 112") may cooperate with a plurality of rotating turbine blades 114 (hereafter "blade 114," or "blades 114") to form each stage L0-L3 of turbine 108 and to define a portion of a working fluid path through turbine 108. Blades 114 in each stage are coupled to rotor 110 (FIG. 1), e.g., by a respective rotor wheel 116 that couples them circumferentially to rotor 110 (FIG. 1). That is, blades 114 are mechanically coupled in a circumferentially spaced manner to rotor 110, e.g., by rotor wheels 116. A static nozzle section 115 includes a plurality of nozzles 112 mounted to a casing 118 and circumferentially spaced around rotor 110 (FIG. 1). It is recognized that blades 114 rotate with rotor 110 (FIG. 1) and thus experience centrifugal force, while nozzles 112 are static.

With reference to FIGS. 1 and 2, in operation, air flows through compressor 102, and pressurized air is supplied to combustor 104. Specifically, the pressurized air is supplied to fuel nozzle section 106 that is integral to combustor 104. Fuel nozzle section 106 is in flow communication with combustion region 105. Fuel nozzle section 106 is also in flow communication with a fuel source (not shown in FIG. 1) and channels fuel and air to combustion region 105. Combustor 104 ignites and combusts fuel to produce combustion gases. Combustor 104 is in flow communication with turbine 108, within which thermal energy from the combustion gas stream is converted to mechanical rotational energy by directing the combusted fuel (e.g., working fluid) into the working fluid path to turn blades 114. Turbine 108 is rotatably coupled to and drives rotor 110. Compressor 102 may also be rotatably coupled to rotor 110. At least one end of rotor 110 may extend axially away from compressor 102 or turbine 108 and may be attached to a load or machinery (not shown), such as, but not limited to, a generator, a load compressor, and/or another turbine.

Figure 3:
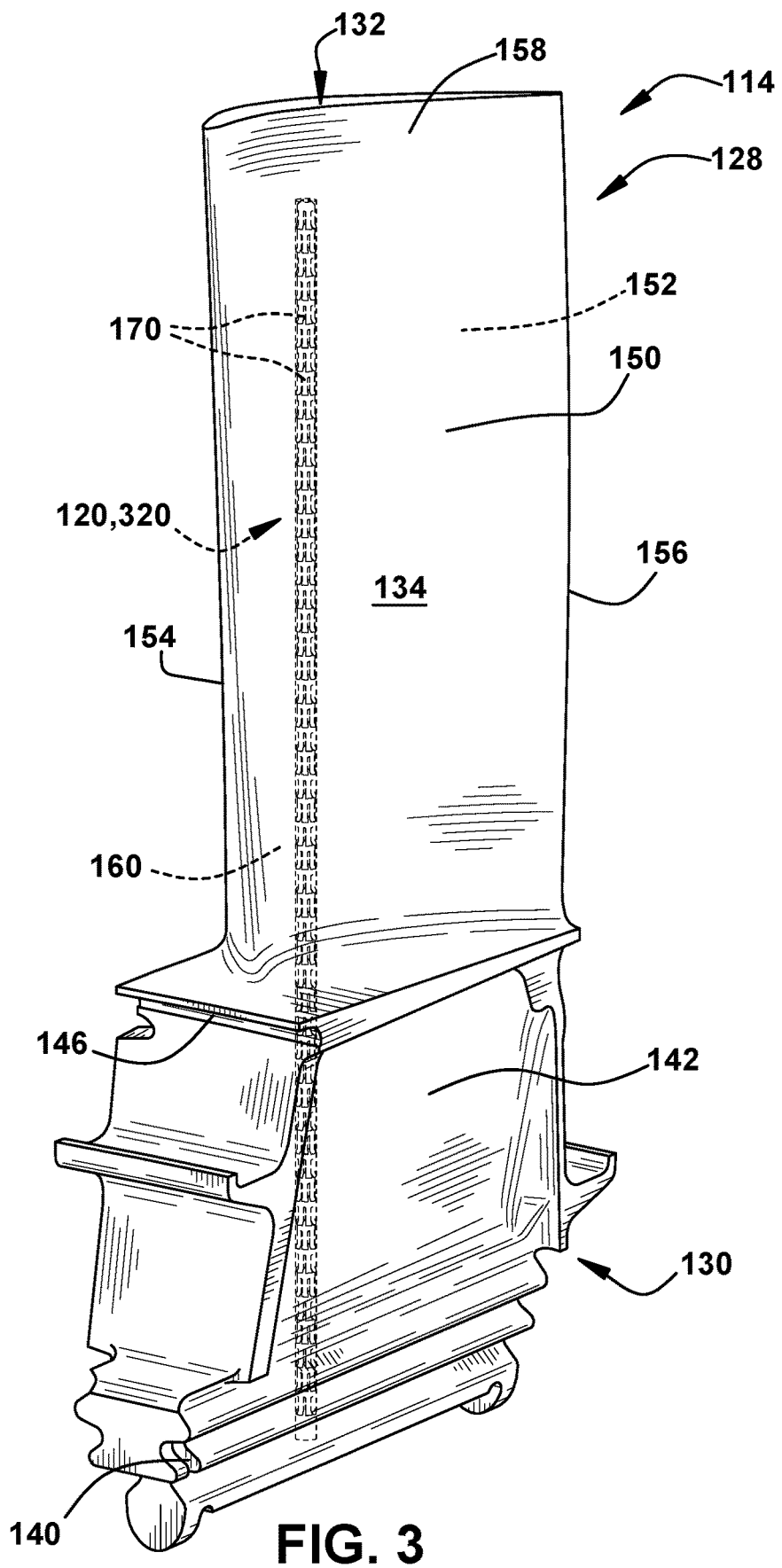
FIG. 3 shows a perspective view of an illustrative turbine blade including a vibration dampening system, according to embodiments of the disclosure.
Figure 4:
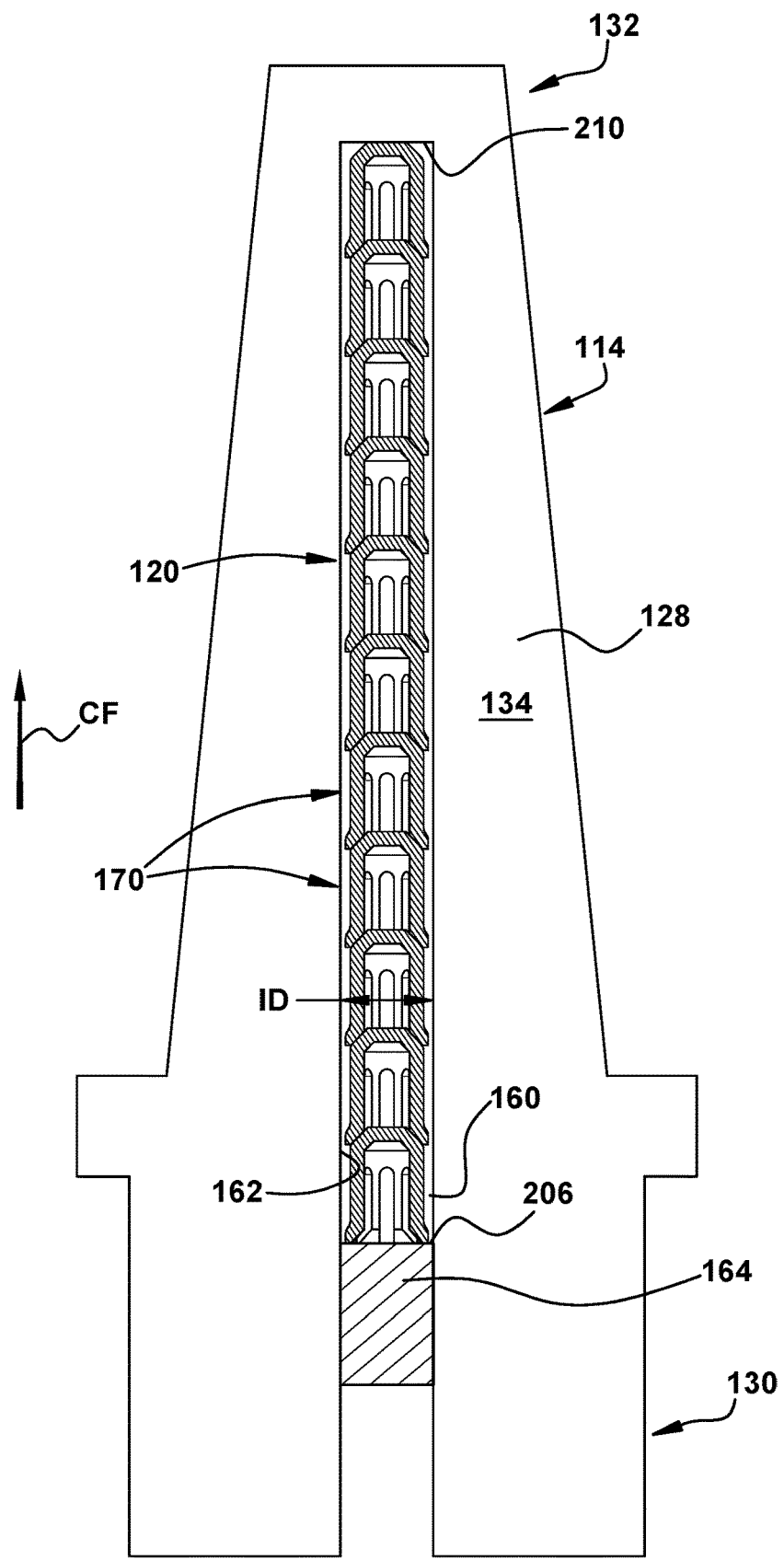
FIG. 4 shows a schematic cross-sectional view of a turbine blade having a vibration dampening system including a plurality of damper elements, according to embodiments of the disclosure.
Figure 5:
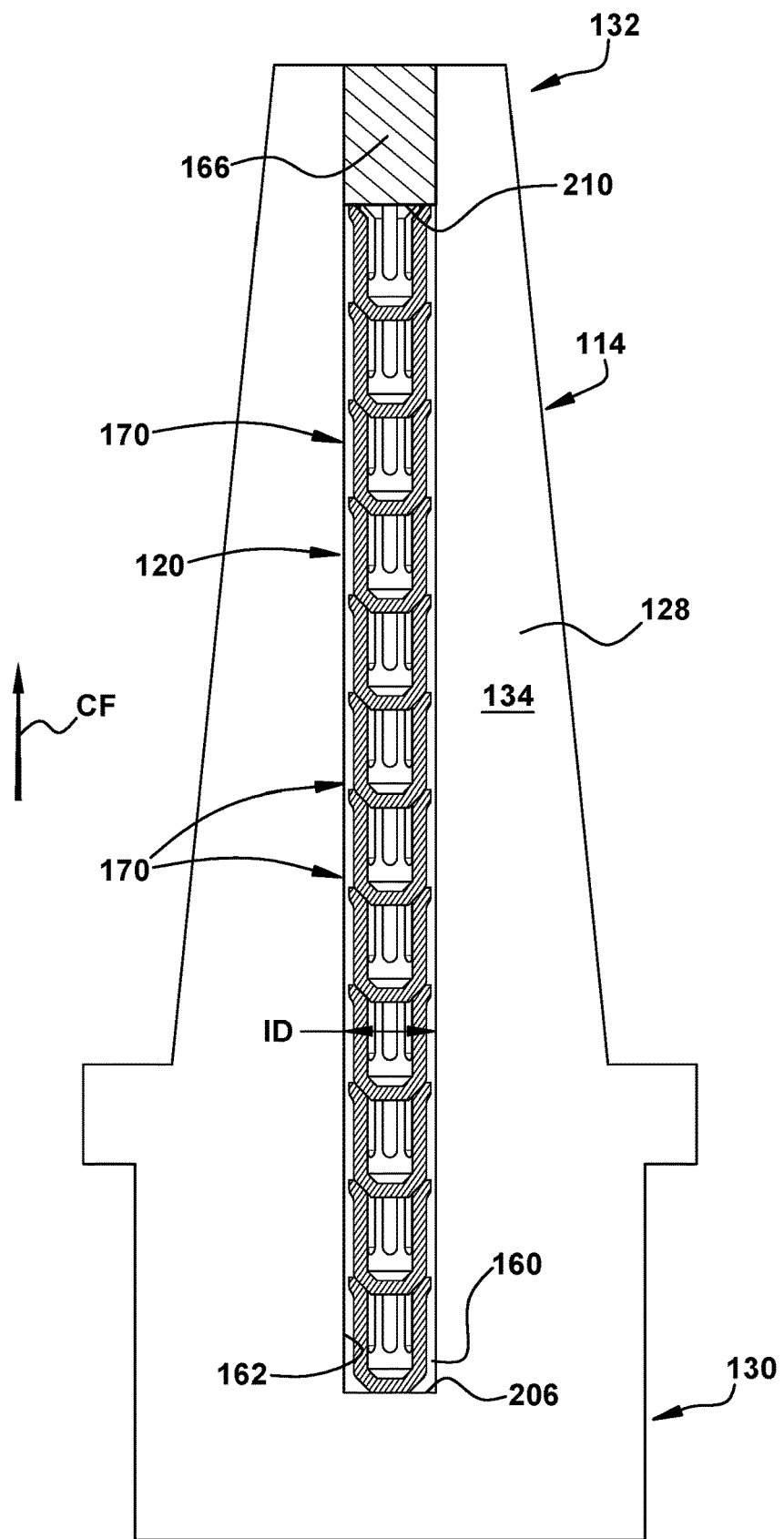
FIG. 5 shows a schematic cross-sectional view of a turbine blade having a vibration dampening system including a plurality of damper elements, according to embodiments of the disclosure.

FIG. 3 shows a perspective view of a (rotating) blade 114 of the type in which embodiments of a vibration dampening system 120, 320 of the present disclosure may be employed. As will be described herein, FIGS. 4 and 5 show schematic cross-sectional views of a blade 114 including vibration dampening system 120, 320, according to various embodiments of the disclosure.

Referring to FIG. 3, each blade 114 includes a body 128 having a base end 130, a tip end 132, and an airfoil 134 extending between base end 130 and tip end 132. As shown in FIG. 3, blade 114 includes a dovetail 140 at base end 130 by which blade 114 attaches to a rotor wheel 116 (FIG. 2) of rotor 110 (FIG. 1). Base end 130 of blade 114 may further include a shank 142 that extends between dovetail 140 and a platform 146. Platform 146 is disposed at the junction of airfoil 134 and shank 142 and defines a portion of the inboard boundary of the working fluid path (FIG. 2) through turbine 108.

It will be appreciated that airfoil 134 in blade 114 is the active component of blade 114 that intercepts the flow of working fluid and induces rotor 110 (FIG. 1) to rotate. It will be seen that airfoil 134 of blade 114 includes a concave pressure side (PS) outer sidewall 150 and a circumferentially or laterally opposite convex suction side (SS) outer sidewall 152 extending axially between opposite leading and trailing edges 154, 156, respectively. Sidewalls 150 and 152 also extend in the radial direction from base end 130 (i.e., platform 146 for blade 114) to tip end 132 (i.e., a tip end 158 for blade 114). Note, in the example shown, blade 114 does not include a tip shroud; however, teachings of the disclosure are equally applicable to a blade including a tip shroud at tip end 158. Blade 114 shown in FIG. 3 is illustrative only, and the teachings of the disclosure can be applied to a wide variety of blades.

During operation of a turbine, blades 114 may be excited into vibration by a number of different forcing functions. For example, variations in working fluid temperature, pressure, and/or density can excite vibrations throughout the rotor assembly, especially within the airfoils and/or tips of blades 114. Gas exiting upstream of the turbine and/or compressor sections in a periodic, or "pulsating," manner can also excite undesirable vibrations. Embodiments of the present disclosure reduce the vibration of a rotating blade 114 without significant change of blade design.

FIGS. 4 and 5 each show a schematic cross-sectional view of blade 114 including vibration dampening system 120 according to embodiments of the disclosure. Vibration dampening system 120 for blade 114 may include a body opening 160 extending through body 128 at least partially between tip end 132 and base end 130 thereof and through airfoil 134. Body opening 160 may extend part of the distance between base end 130 and tip end 132, or it may extend through one or more of base end 130 or tip end 132. Body opening 160 may be defined in any part of any structure of body 128. For example, where body 128 includes an internal partition wall (not shown), for example, for defining a cooling circuit therein, body opening 160 may be defined as an internal cavity in the partition wall in body 128. Body opening 160 generally extends radially in body 128. However, some angling, and perhaps curving, of body opening 160 relative to a radial extent of body 128 is possible. Body opening 160 has an inner surface 162. Body opening may have an inner diameter ID.

As shown in FIG. 4, body opening 160 may originate at base end 130 of blade 114, or, as shown in FIG. 5, it may originate at tip end 132 of blade 114. More particularly, as shown in FIG. 4, body opening 160 may be open in base end 130 and terminate in tip end 132, or, as shown in FIG. 5, it may be open in tip end 132 and terminate in base end 130. Body opening 160, wherever located, may assist in assembly of vibration dampening system 120 in blade 114 and may allow retrofitting of the system into an existing blade. Where body opening 160 extends through base end 130, as shown in FIG. 4, a closure member 164 for closing body opening 160 may be provided. Where body opening 160 extends through tip end 132, as shown in FIG. 5, a closure member 166 for body opening 160 may be provided. In addition to closing body opening 160, closure members 164, 166 also prevent removal of vibration dampening system 120 from body opening 160, e.g., during use. Body opening 160 may have a radially inner end 206 and a radially outer end 210, each of which may be provided at least in part by closure members 164, 166 depending on embodiment.

Figure 6:
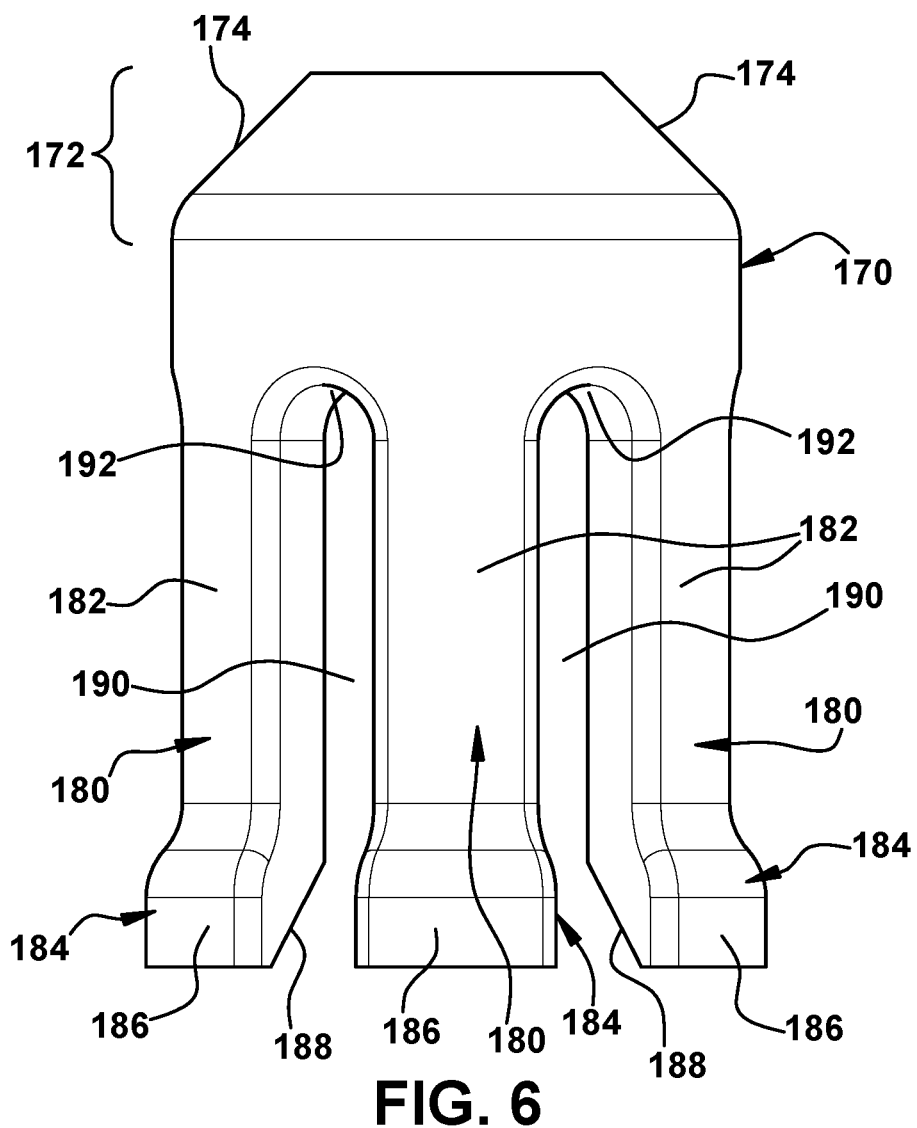
FIG. 6 shows a side view of a damper element, according to embodiments of the disclosure.
Figure 7A:
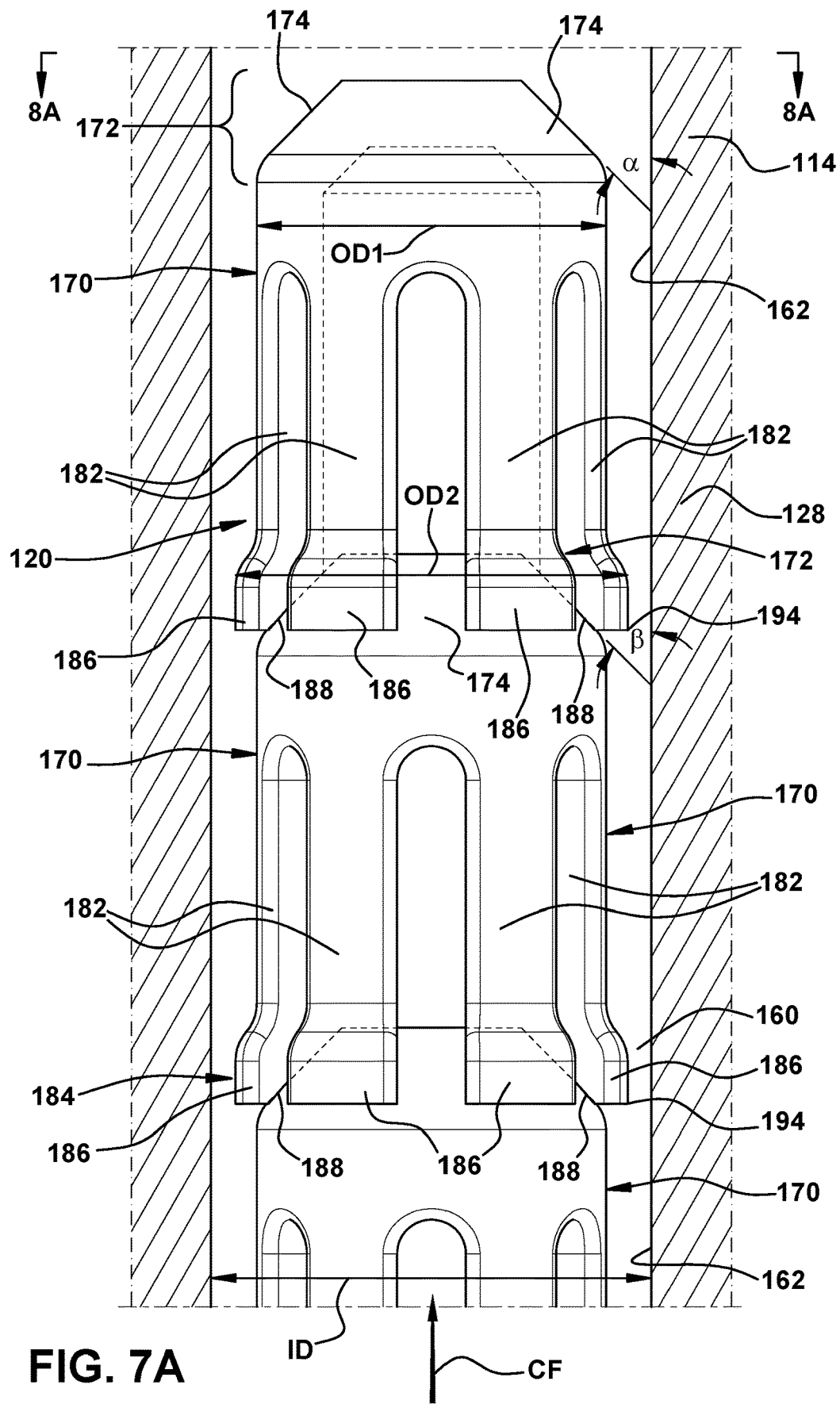
FIG. 7A shows a side, partially cross-sectional view of a vibration dampening system including a plurality of stacked damper elements in a first position, according to embodiments of the disclosure.
Figure 7B:
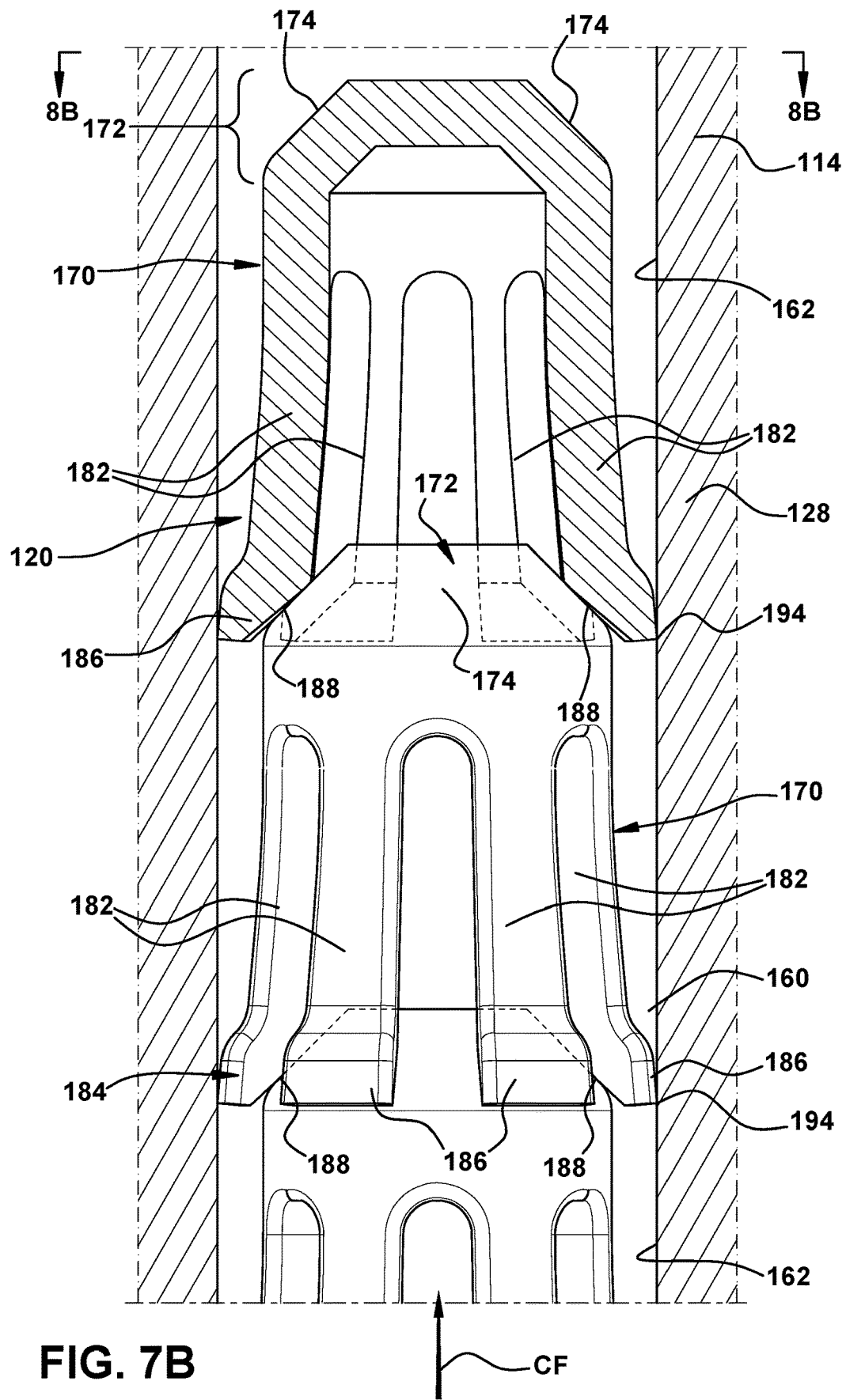
FIG. 7B shows a side, partially cross-sectional view of a vibration dampening system including a plurality of stacked damper elements in a second position, according to embodiments of the disclosure.
Figure 8A:
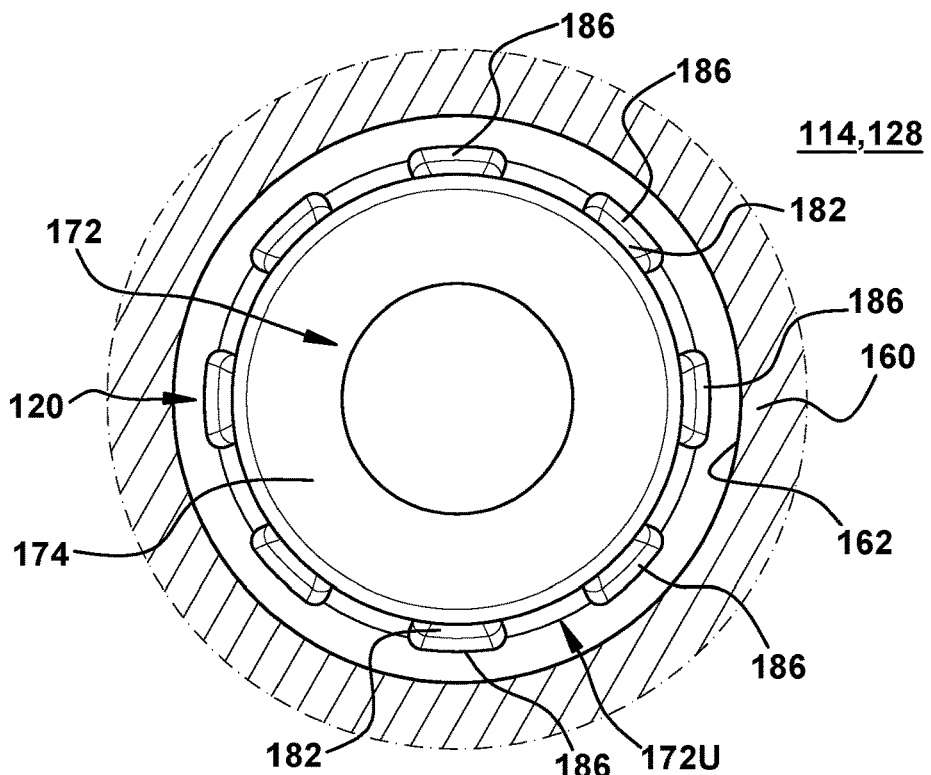
FIG. 8A shows a top-down view along view line 8A-8A in FIG. 7A.
Figure 8B:
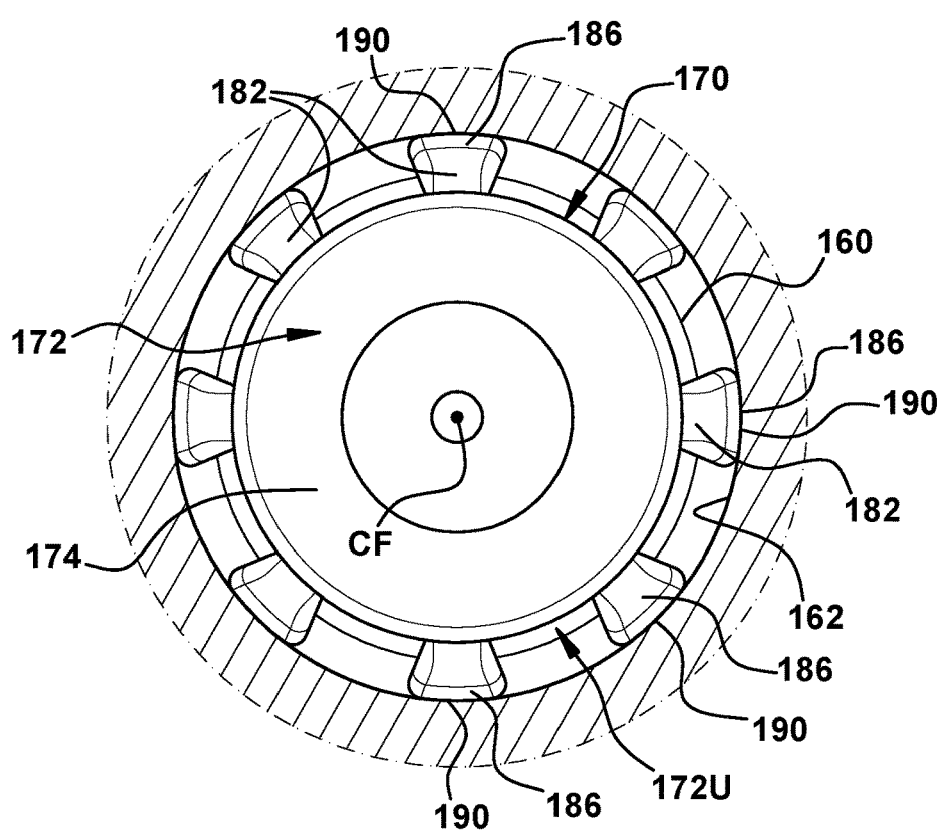
FIG. 8B shows a top-down view along view line 8B-8B in FIG. 7B.

FIG. 6 shows a perspective view of a damper element 170, according to embodiments of the disclosure. FIG. 7A shows a partial cross-sectional view of vibration dampening system 120 in a first position, and FIG. 7B shows a partial cross-sectional view of vibration dampening system 120 in a second position, according to embodiments of the disclosure. FIG. 8A shows a top-down view along view line 8A-8A in FIG. 7A; and FIG. 8B shows a top-down view along view line 8B-8B in FIG. 7B.

As shown in FIGS. 7A-B, damper element 170 for vibration dampening system 120 is shown in body opening 160 in rotating blade 114 in turbine 108 (FIG. 1). As shown in FIGS. 6 and 7A-B, damper element 170 includes a head member 172 having an at least partially ramped surface 174. Damper element 170 also includes a plurality of flexible legs 180 (hereafter simply "flexible legs 180") extending from head member 172. Each flexible leg 180 includes a radially extending body section 182 (relative to blade 114) having an end section 184. End sections 184 have an outer end surface 186 and an inner end surface 188. As will be described further herein, and as shown in FIGS. 7B and 8B, head member 172 engages with flexible legs 180 of another, adjacent damper element 170 to cause flexible legs 180 thereof to flex outwardly and frictionally engage with inner surface 162 of body opening 160 under influence of a centrifugal force CF caused by rotation of rotating blade 114 at higher than a predefined rotational speed to dampen vibration.

Each flexible leg 180 can have any structure capable of permitting it to flex outwardly such that outer end surfaces 186 can frictionally engage with inner surface 162 of body opening 160 in blade 114. In the illustrative embodiments shown, adjacent radially extending body sections 182 (hereafter "body sections 182") of flexible legs 180 define a slot 190 therebetween. Slots 190 may terminate at head member 172. Slots 190 may have a rounded radially outer extent 192, e.g., U-shaped; however, other shapes are also possible, e.g., V-shaped, cathedral-shaped, etc. Any number of flexible legs 180 can be provided on each damper element 170. In certain embodiments, between three (3) and six (6) flexible legs 180 are used on each damper element 170, but other numbers are also possible. In other embodiments, body sections 182 can have alternative structures to aid and/or control flexing thereof such as but not limited to: wider or thinner sections, curvature, voids, etc.

As noted previously, head member 172 has at least partially ramped surface 174. At least partially ramped surface 174 (hereafter "ramped surface 174" for brevity) may extend all the way around it, e.g., as a solid circular surface, or partially around head member 172, i.e., with breaks or open areas between similarly ramped surfaces. Ramped surface(s) 174 may have an angle α in a range between 25° and 55° degrees relative to inner surface 162 of body opening 160. As noted, body opening 160 may extend generally radially in body 128 of blade 114. Inner end surfaces 188 of plurality of flexible legs 180 are configured to receive ramped surface 174 of head member 172 of an adjacent damper element 170, i.e., engage and move under influence of ramped surface 174. Inner end surfaces 188 of flexible legs 180 may have an angle β in a range between 25° and 55° degrees relative to inner surface 162 of body opening 160. Angle α and angle β may be the same, but this is not necessary in all cases, so long as head member 172 can force legs 180 of an adjacent damper element 170 outwardly toward inner surface 162 of body opening 160. That is, head member 172 of an adjacent damper element 170 can force outer end surfaces 186 of flexible legs 180 into frictional engagement with inner surface 162 of body opening 160 to dampen vibration when a particular centrifugal force CF is applied based on a predetermined rotational speed of blade 114.

In certain embodiments, head member 172 and, collectively, body sections 182 of flexible legs 180 each have a first outer diameter OD1. Outer end surfaces 186 of flexible legs 180 collectively define a second outer diameter OD2 that is larger than first outer diameter OD1. Hence, head member 172 and body sections 182 have a smaller outer diameter OD1 than outer end surfaces 186 of flexible legs, i.e., OD2. Although shown and described as the same outer diameter OD1, body sections 182 and head member 172 may have different outer diameters so long as they are both smaller than the outer diameter OD2 of outer end surfaces 186. As shown in FIGS. 7A and 8A, second outer diameter OD2 of outer end surfaces 186 is smaller than inner diameter ID of body opening 160 whereby, in a relaxed state, flexible legs 180 pass freely within body opening 160. Further, in certain embodiments, outer end surfaces 186 of each flexible leg 180 may be parallel to inner surface 162 of body opening 160 in a relaxed state of the plurality of flexible legs 180. In other embodiments, outer end surfaces 186 of each flexible leg 180 may be non-parallel to inner surface 162 of body opening 160 in a relaxed state of the plurality of flexible legs 180, but not more than +/−5°. In any event, damper elements 170 can be easily inserted into body opening 160 singularly or in a pre-stacked fashion without outer end surfaces 186 of end sections 184 thereof interfering with the insertion.

As shown in FIGS. 7B and 8B, under influence of a centrifugal force CF caused by rotation of rotating blade 114 at higher than a predefined rotational speed, head member 172 of the adjacent damper element 170 forces outer end surfaces 186 of flexible legs 180 into frictional engagement with inner surface 162 of body opening 160 to dampen vibration. In certain embodiments, as shown, outer end surfaces 186 of each flexible leg 180 may include an edge 194 that frictionally engages with inner surface 162 of body opening 160 at a line. Outer end surfaces 186 of each flexible leg 180 are parallel to inner surface 162 of body opening 160 in a relaxed state of the plurality of flexible legs 180, but tilt as flexible legs 180 flex outwardly to meet inner surface 162 at edge 194 thereof.

As shown in FIGS. 7A-8B, vibration dampening system 120 for rotating blade 114 includes a plurality of stacked damper elements 170 for positioning in body opening 160 defined in rotating blade 114. Any number of damper elements 170 may be used. As previously described, each damper element 170 includes head member 172 having at least partially ramped surface 174, and plurality of flexible legs 180 extending from head member 172. Each flexible leg 180 includes radially extending body section 182 having end section 184 with the end section having outer end surface 186 and inner end surface 188. Inner end surfaces 188 of plurality of flexible legs 180 of each damper element 170 are configured to receive ramped surface 174 of head member 172 of an adjacent damper element 170 of plurality of stacked damper elements 170. As shown in FIGS. 7B and 8B, under influence of centrifugal force CF caused by rotation of the rotating blade 114 at higher than a predefined rotational speed, head member 172 of an adjacent damper element 170 forces outer end surfaces 186 of plurality of flexible legs 180 into frictional engagement with inner surface 162 of body opening 160 to dampen vibration.

Where damper elements 170 within the stack are identical, they can all react in the same manner, e.g., have flexible legs 180 spring outwardly, simultaneously or in sequence within the stack. However, in other embodiments, two or more damper elements 170 can be customized to react in different manners. In this case, plurality of damper elements 170 have at least one of the following characteristics different between at least two damper elements: overall mass, overall radial length, radial length of the plurality of flexible legs, force(s) required to flex the plurality of flexible legs outwardly, shape(s) of the inner end surfaces, shape(s) of the outer end surfaces, and/or angle(s) of the at least partially ramped surfaces. Different damper elements 170 may be activated into frictional dampening in different circumstances. For example, one or more damper elements 170 may be activated under a first centrifugal force CF1 at a first predetermined rotational speed ω1 of rotating blade 114, and one or more different damper elements 170 may be activated under a second centrifugal force CF2 (different than first centrifugal force CF1) at a second predetermined rotational speed ω2 (different than first predetermined rotational speed ω1) of rotating blade 114. As those with skill in the art will recognize, a large number of different characteristics and different damper elements 170 can be used to provide customized vibration dampening, e.g., at different centrifugal forces, different radii along blade 114, among other operational parameters.

In certain embodiments, as shown in FIGS. 4 and 5, vibration dampening system 120 includes plurality of stack damper elements 170 alone, i.e., with damper elements interacting with a radially outer end 210 of body opening 160, i.e., end of body opening 160 as in FIG. 4 or with closure member 166 providing at least part of radial outer end 210, as in FIG. 5.

Figure 9:
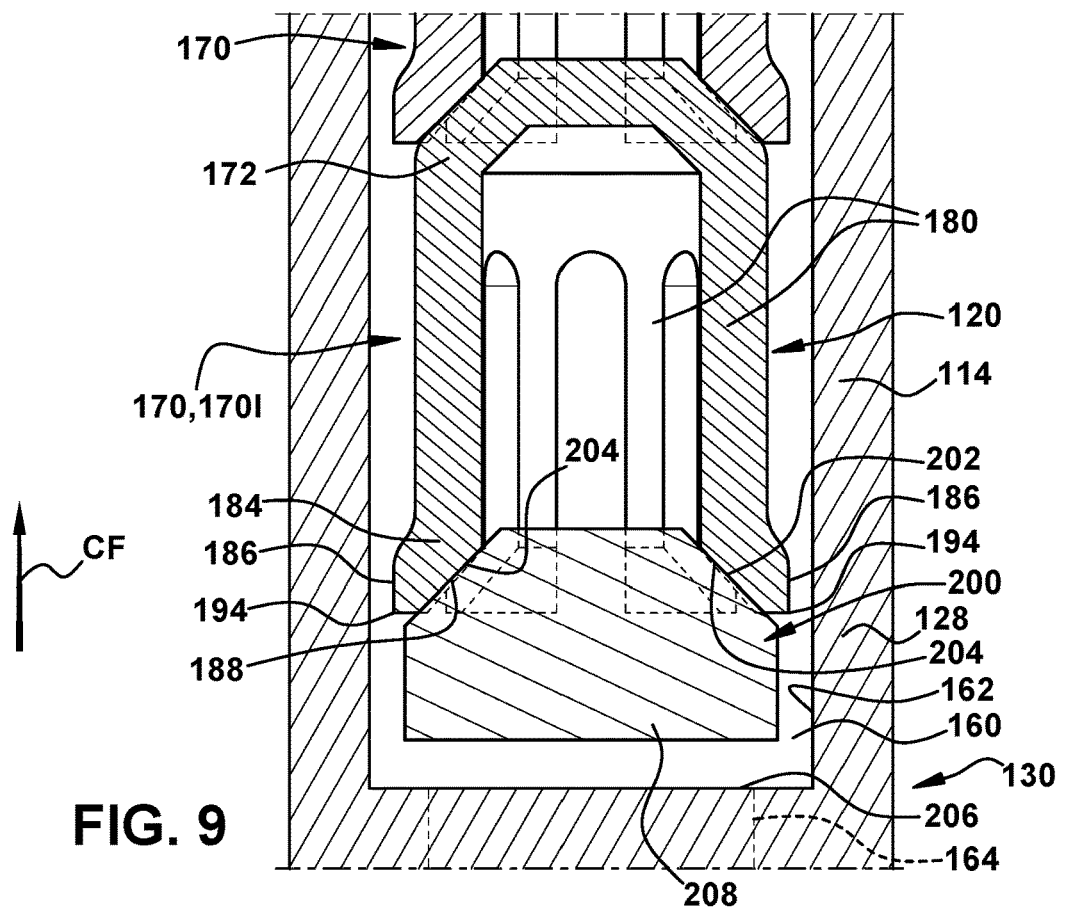
FIG. 9 shows a side, partially cross-sectional view of a radially inner end element for a vibration dampening system, according to an optional embodiment of the disclosure.

FIG. 9 shows a cross-sectional view of an optional embodiment in which, as in FIG. 4, plurality of flexible legs 180 extend radially inward from a respective head member 172 of damper element 170. In FIG. 9, vibration dampening system 120 further includes a radially inner end element 200 having a head member 202 having an at least partially ramped surface 204 configured to engage inner end surfaces 188 of plurality of flexible legs 180 of a radially innermost one 170I of plurality of stacked damper elements 170. Ramped surface 204 of radially inner end element 200 may have a similar configuration to ramped surfaces 174 of head members 172 of damper elements 170. More particularly, radially inner end element 200 may have a radially inner end section 208 configured to engage radially inner end 206 of body opening 160 (i.e., end of body opening 160 with or without closure member 164 (in dashed lines in FIG. 9)) in a relaxed, inoperative state of rotating blade 114. In an operative state of blade 114, centrifugal force CF forces radially inner end element 200 against radially innermost damper element 170I to force outer end surfaces 186 of flexible legs 180 thereof (i.e., edges 194) into frictional engagement with inner surface 162 of body opening 160 to dampen vibration. Radially inner end element 200 may be weighted to increase centrifugal force CF applied to stacked damper element(s) 170 radially outward thereof.

Figure 10:
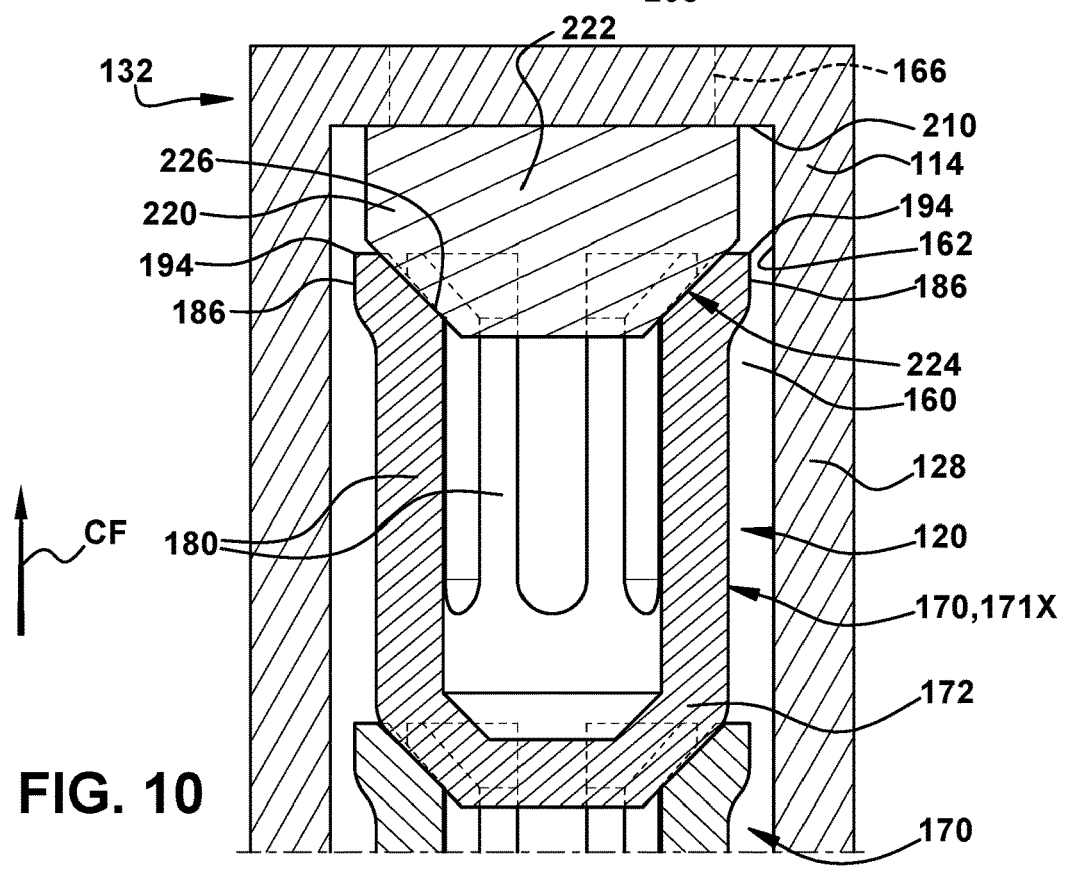
FIG. 10 shows a side, partially cross-sectional view of a radially outer end element for a vibration dampening system, according to an optional embodiment of the disclosure.

FIG. 10 shows a cross-sectional view of an optional embodiment in which, as in FIG. 5, plurality of flexible legs 180 extend radially outward from a respective head member 172 of each of plurality of stacked damper elements 170. In FIG. 10, vibration dampening system 120 may further include a radially outer end element 220 configured to engage flexible legs 180 of a radially outermost one 170X of plurality of stacked damper elements 170. More particularly, radially outer end element 220 may having a radially outer end section 222 configured to engage radially outer end 210 of body opening 160 (i.e., end of body opening 160 with or without closure member 166 (in dashed lines in FIG. 9)) and a head member 224 having an at least partially ramped surface 226 configured to engage inner end surfaces 188 of plurality of flexible legs 180 of a radially outermost one 170X of plurality of stacked damper elements 170. Ramped surface 226 of radially outer end element 220 may have a similar configuration to ramped surfaces 174 of head members 172 of damper elements 170. Centrifugal force CF forces radially outermost damper element 170X against radially outer end element 220 to force outer end surfaces 186 thereof (i.e., edges 194) into frictional engagement with inner surface 162 of body opening 160 to dampen vibration.

With further regard to FIGS. 4 and 5, FIG. 4 shows a cross-sectional view of an embodiment in which plurality of flexible legs 180 extend radially inward from a respective head member 172 of each of the plurality of damper elements 170 and closure member 164 is in base end 130 of blade 114. Also, FIG. 5 shows a cross-sectional view of an embodiment in which plurality of flexible legs 180 extend radially outward from a respective head member 172 of each of plurality of stacked damper elements 170 and closure member 166 is in tip end 132 of blade 114. It is emphasized that the arrangement of stacked damper elements 170 in FIGS. 4 and 5 can be switched. That is, the arrangement of damper elements 170 shown in FIG. 5 could be used in a blade 114 with closure member 164 in base end 130 of blade 114 as in FIG. 4, and the arrangement of damper elements 170 shown in FIG. 4 could be used in a blade 114 with closure member 166 in tip end 132 of blade 114 as in FIG. 5. The optional embodiments of end elements 200, 220 could also be used as desired in those alternative arrangements.

Figure 11:
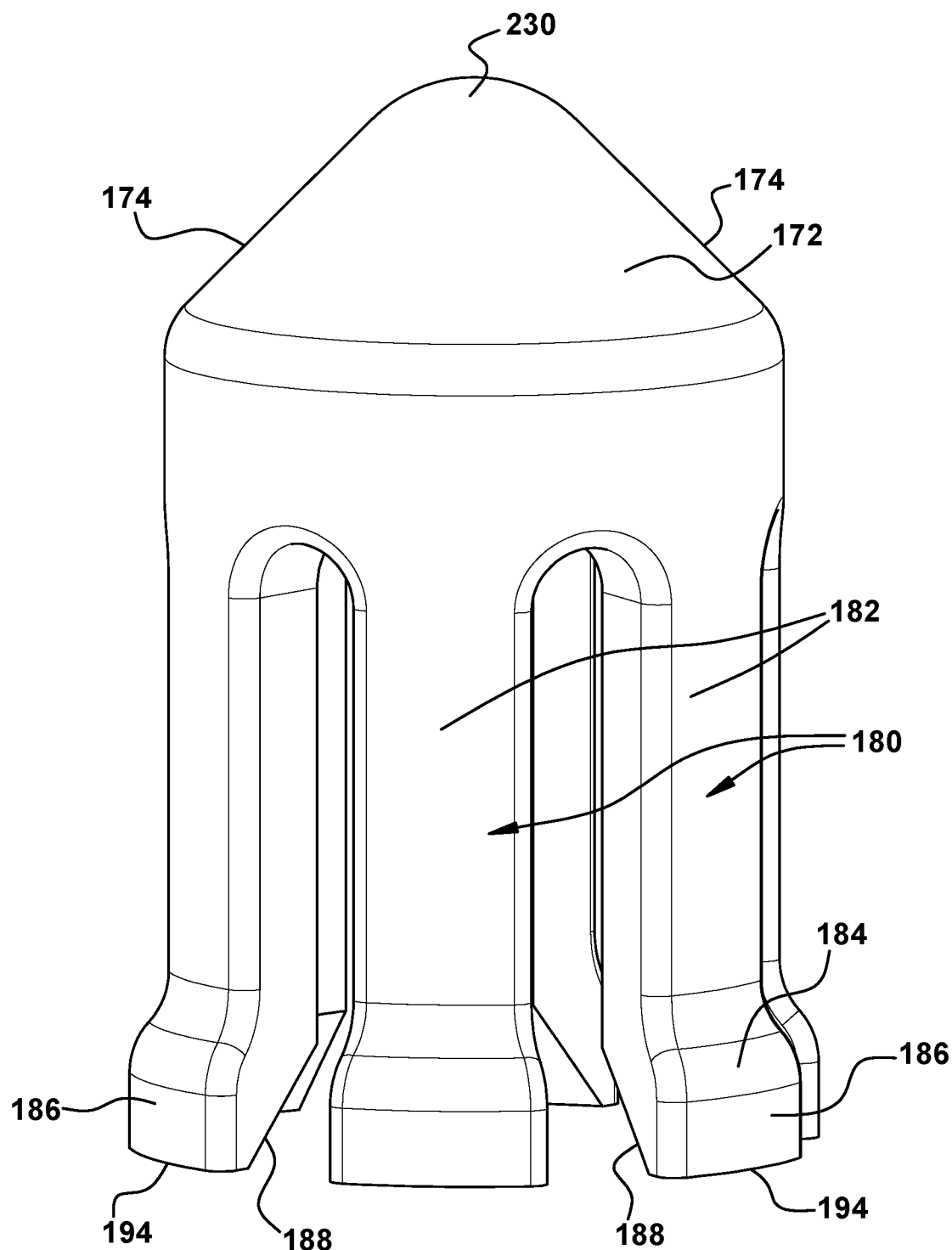
FIG. 11 shows a perspective view of a damper element, according to other embodiments of the disclosure.

In FIGS. 4-10, head member 172 of damper elements 170 has ramped surface 174 having a frustoconical shape. FIG. 11 shows a perspective view of a damper element 170 according to another embodiment in which head member 172 has ramped surface 174 but has a domed end 230, i.e., it has a rounded end rather than a flat end.

In operation, stacked damper elements 170 each provide flexible legs 180 that will expand to frictionally engage inner surface 162 of body opening 160. As noted, damper elements 170 can be customized in a number of ways to expand and frictionally engage at different operational parameters. Stacked damper elements 170 are more likely to capture relative motion because they are forced to expand and touch inner surface 162 of body opening 160 of blade 114. This arrangement is advantageous because it not only allows for damper elements 170 to move immediately with body opening 160 in blade 114, but the sliding between adjacent damper elements 170 creates a stick-slip motion that is also effective for vibration dampening.

Figure 12:
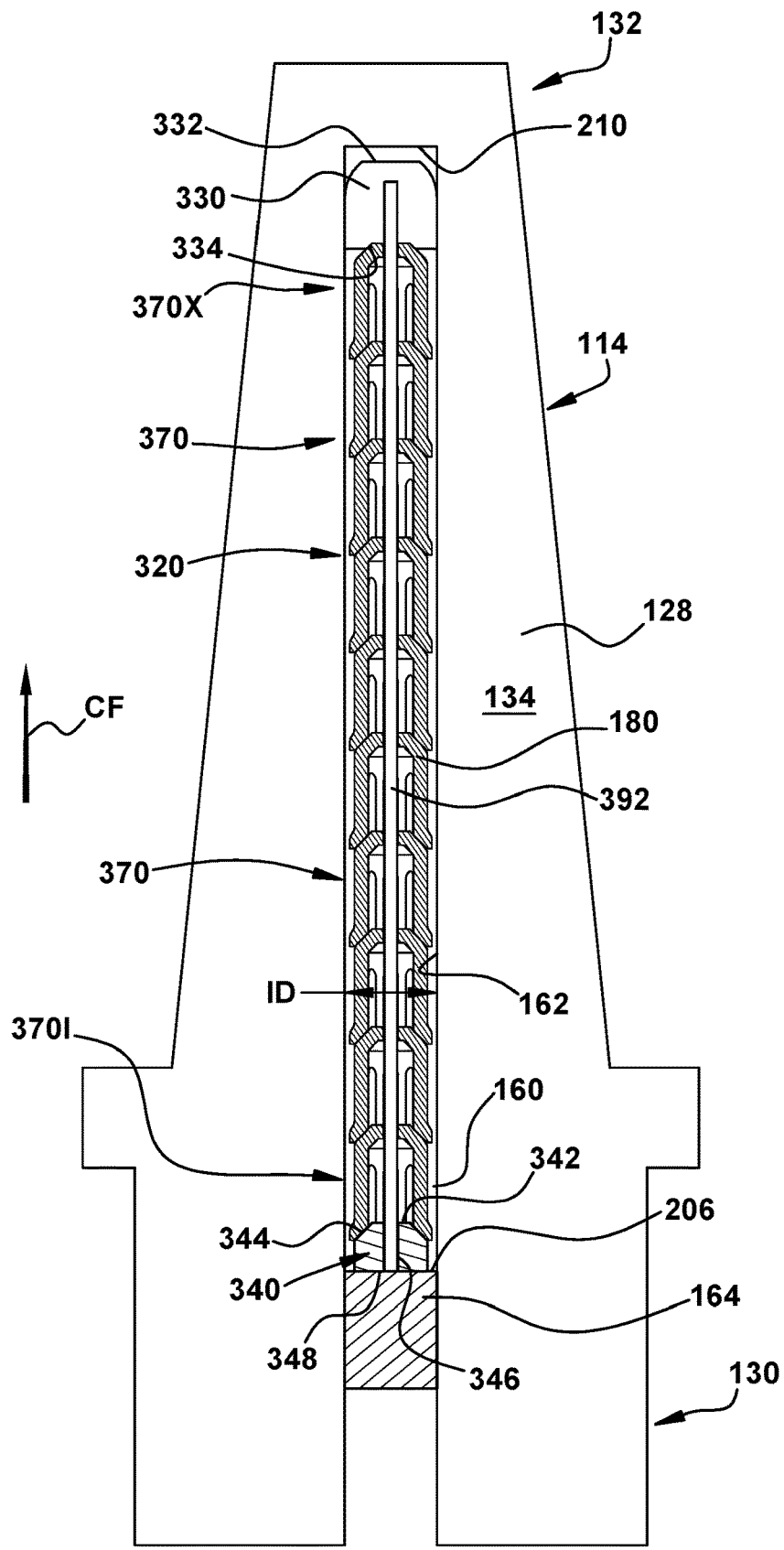
FIG. 12 shows a schematic cross-sectional view of a turbine blade having a vibration dampening system including a plurality of damper elements, according to other embodiments of the disclosure.
Figure 13:
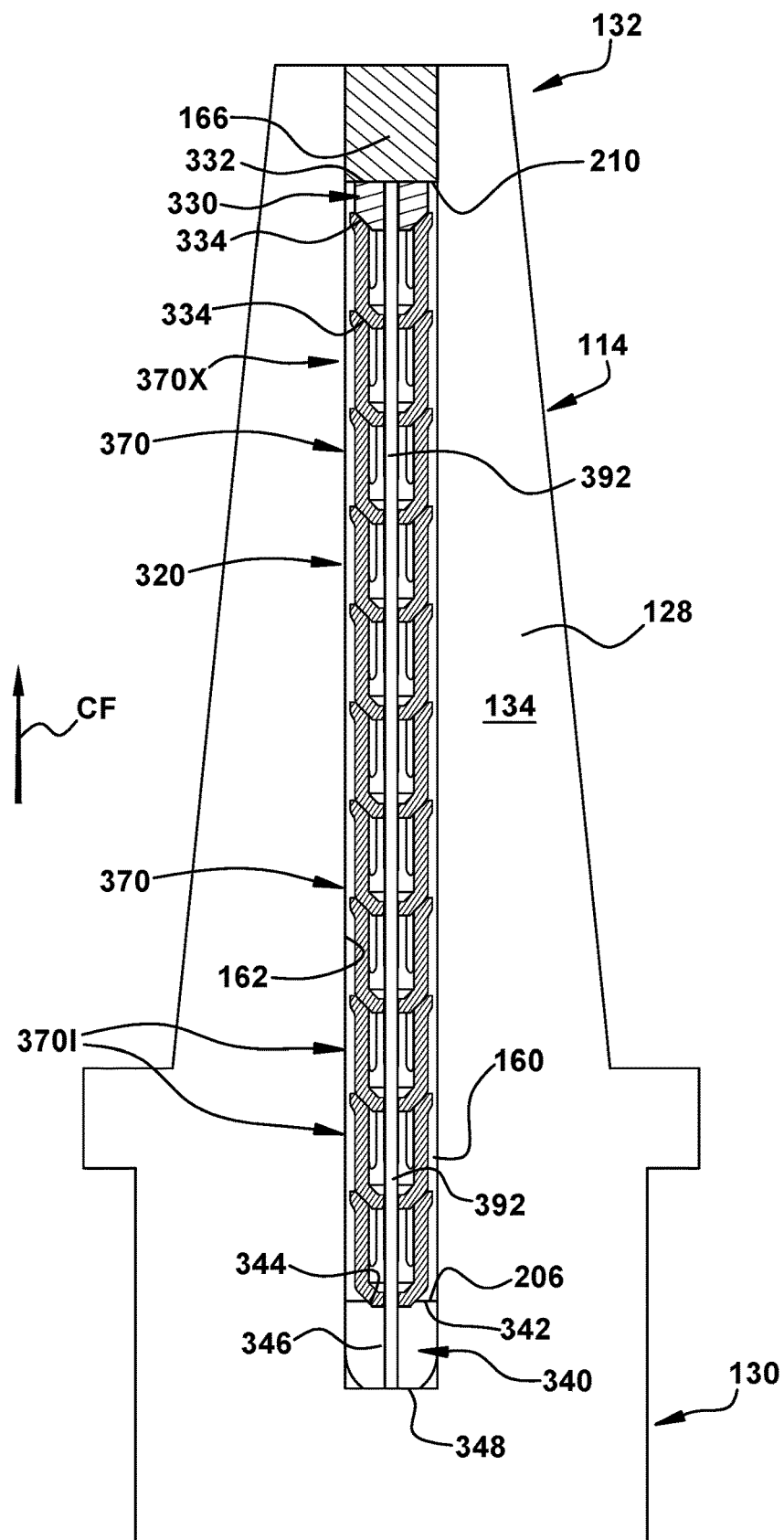
FIG. 13 shows a schematic cross-sectional view of a turbine blade having a vibration dampening system including a plurality of damper elements, according to other embodiments of the disclosure.
Figure 14:
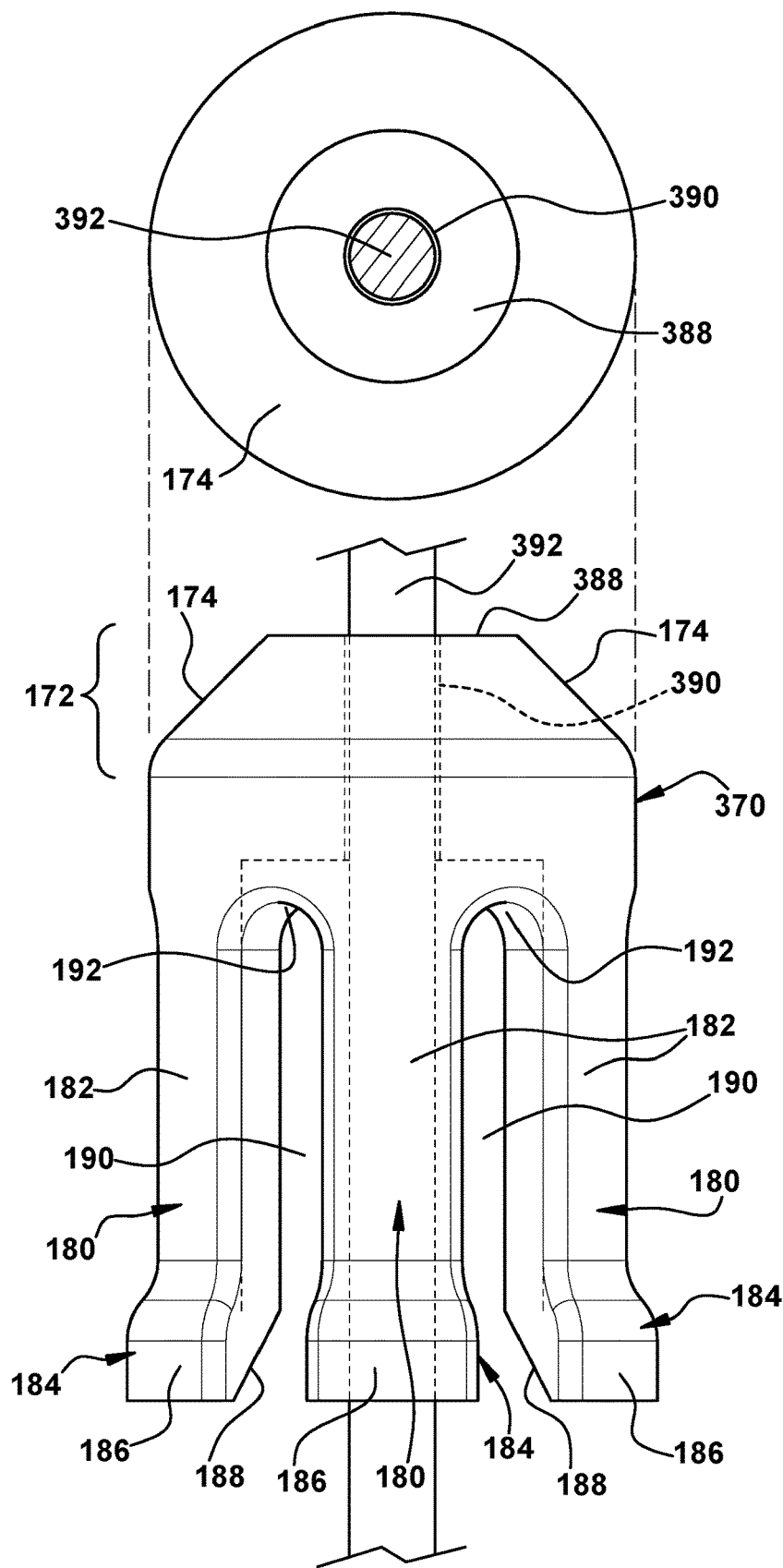
FIG. 14 shows a side view of a damper element with a top surface thereof superimposed above the damper element, according to other embodiments of the disclosure.
Figure 15A:
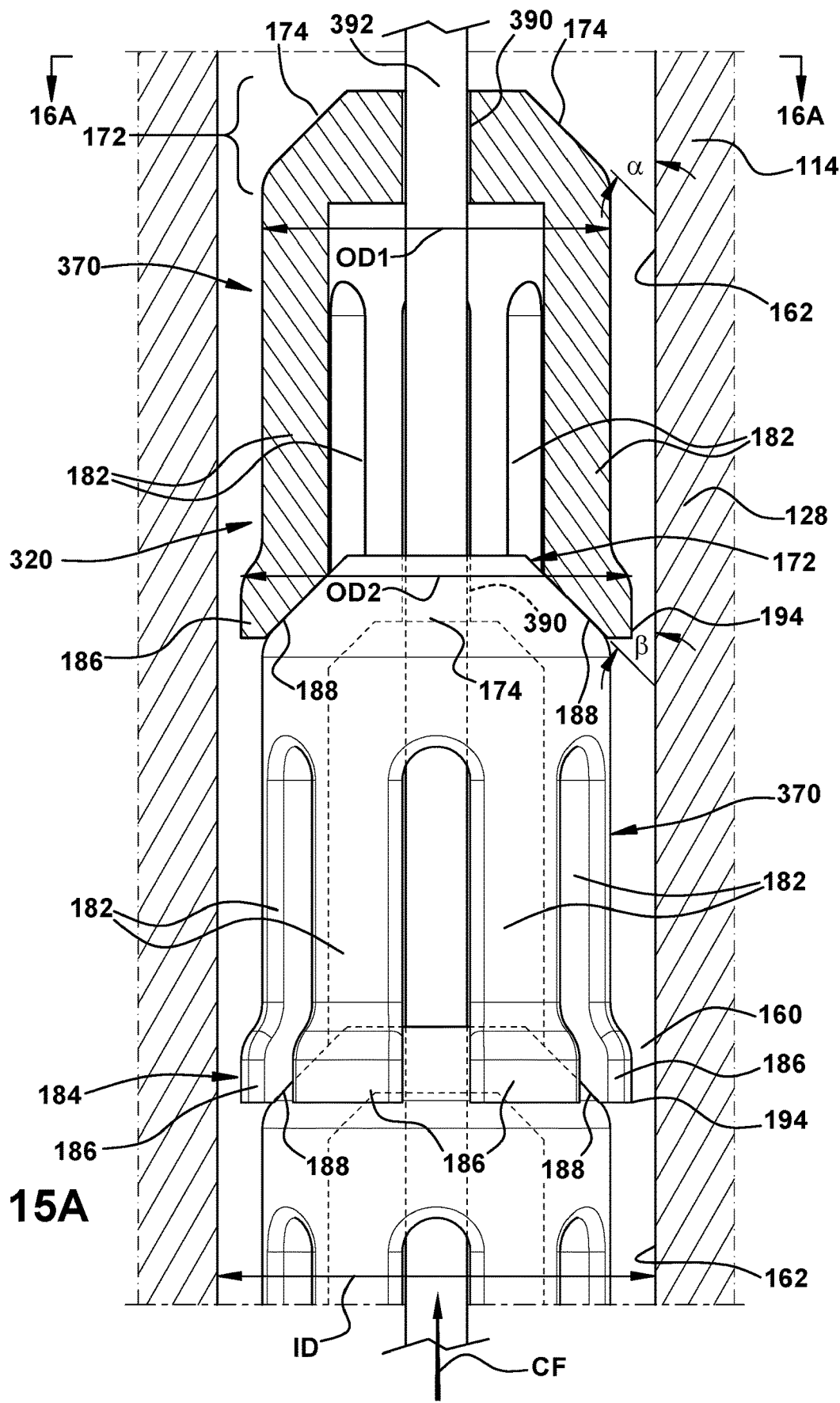
FIG. 15A shows a side, partially cross-sectional view of a vibration dampening system including a plurality of stacked damper elements in a first position, according to other embodiments of the disclosure.
Figure 15B:
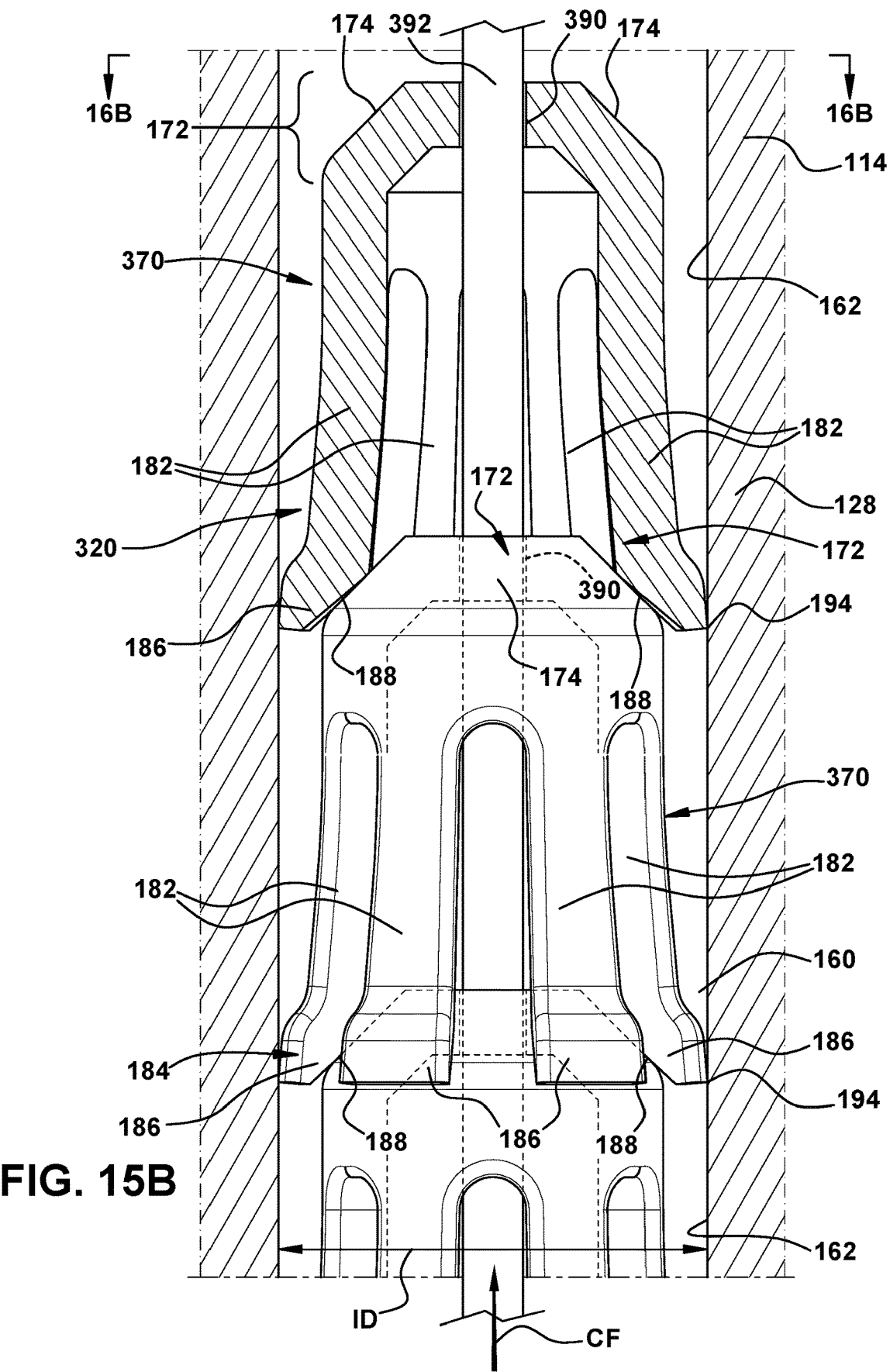
FIG. 15B shows a side, partially cross-sectional view of a vibration dampening system including a plurality of stacked damper elements in a second position, according to other embodiments of the disclosure.
Figure 16A:
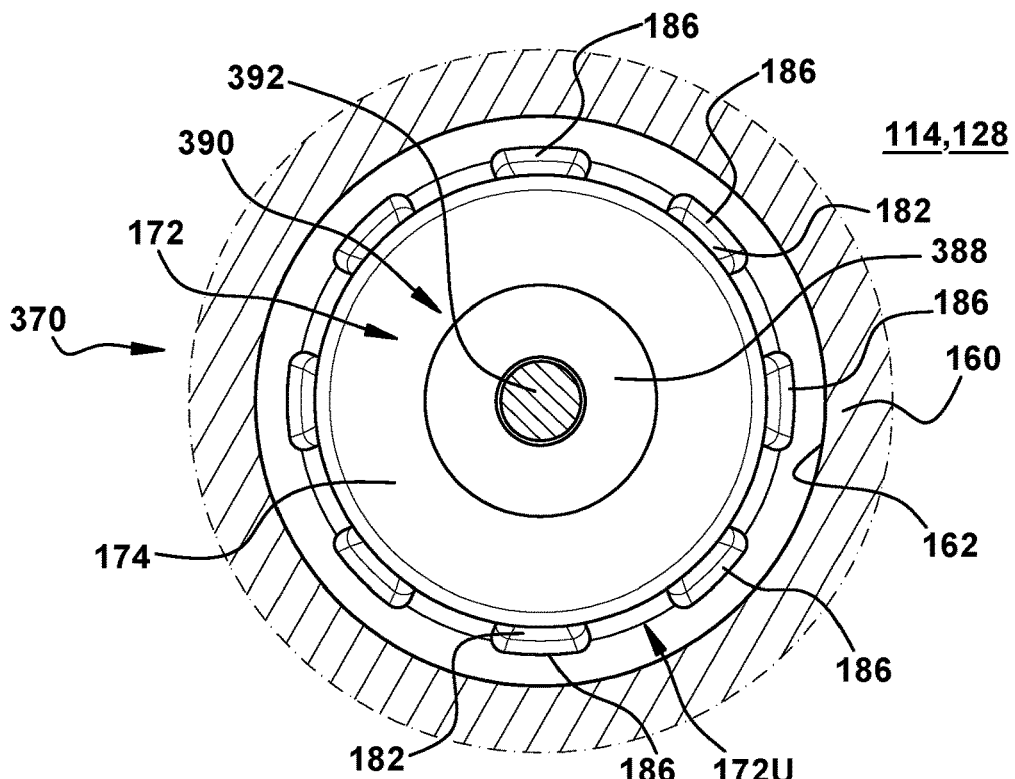
FIG. 16A shows a top-down view along view line 16A-16A in FIG. 15A.
Figure 16B:
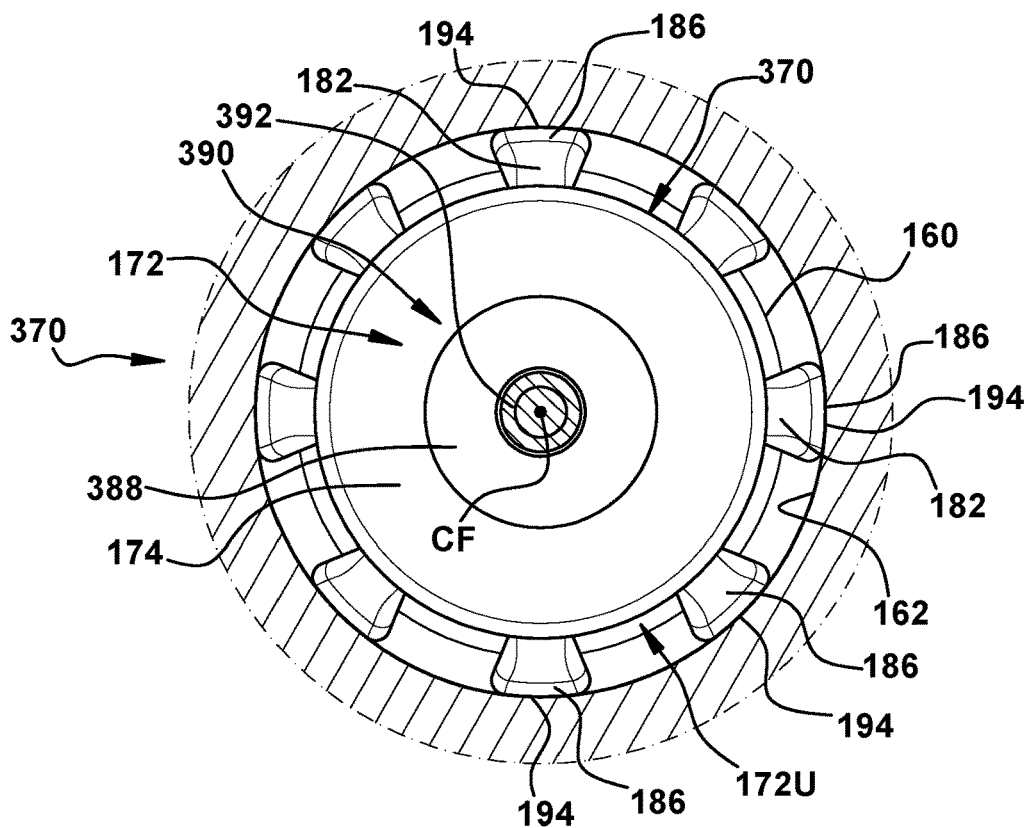
FIG. 16B shows a top-down view along view line 16B-16B in FIG. 16B.

FIGS. 12-16B show a vibration dampening system 320 with a plurality of stack damping elements 370 according to other embodiments of the disclosure. FIGS. 12-16B are similar to FIGS. 4-8B in terms of layout. More particularly, FIG. 12 shows a schematic cross-sectional view of a turbine blade having vibration dampening system 320 including damper elements 370, according to other embodiments of the disclosure; and FIG. 13 shows a schematic cross-sectional view of a turbine blade having vibration dampening system 320 including a plurality of damper elements 370, according to yet other embodiments of the disclosure. FIG. 14 shows a side view of a damper element 370 with a top surface 388 thereof superimposed above the damper element. FIG. 15A shows a side, partially cross-sectional view of a vibration dampening system 320 including a plurality of stacked damper elements 370 in a first position; and FIG. 15B shows a side, partially cross-sectional view of a vibration dampening system 320 including a plurality of stacked damper elements 370 in a second position, according to other embodiments of the disclosure. FIG. 16A shows a top-down view along view line 16A-16A in FIG. 15A; and FIG. 16B shows a top-down view along view line 16B-16B in FIG. 16B.

As shown FIGS. 12 and 13, vibration dampening system 320 for blade 114 may include body opening 160 extending through body 128 at least partially between tip end 132 and base end 130 thereof and through airfoil 134. Body opening 160 may extend part of the distance between base end 130 and tip end 132, or it may extend through one or more of base end 130 or tip end 132. Body opening 160 may be defined in any part of any structure of body 128. For example, where body 128 includes an internal partition wall (not shown), for example, for defining a cooling circuit therein, body opening 160 may be defined as an internal cavity in the partition wall in body 128. Body opening 160 generally extends radially in body 128. However, some angling, and perhaps curving, of body opening 160 relative to a radial extent of body 128 is possible. Body opening 160 has an inner surface 162. Body opening may have an inner diameter ID.

As shown in FIG. 12, body opening 160 may originate at base end 130 of blade 114, or, as shown in FIG. 13, it may originate at tip end 132 of blade 114. More particularly, as shown in FIG. 12, body opening 160 may be open in base end 130 and terminate in tip end 132, or, as shown in FIG. 13, it may be open in tip end 132 and terminate in base end 130. The open end may assist in assembly of vibration dampening system 120 in blade 114 and may allow retrofitting of the system into an existing blade. Where body opening 160 extends through base end 130, as shown in FIG. 12, closure member 164 for closing body opening 160 may be provided. Where body opening 160 extends through tip end 132, as shown in FIG. 13, closure member 166 for body opening 160 may be provided. In addition to closing body opening 160, closure members 164, 166 also prevent removal of vibration dampening system 120 from body opening 160, e.g., during use. Body opening 160 may have radially inner end 206 and radially outer end 210, each of which may be provided at least in part by closure members 164, 166 depending on embodiment.

Vibration dampening system 320 (and damper elements 370 therefor) is substantially similar, structurally and functionally, to that described relative to other embodiments herein. For example, damper elements 370 are substantially similar to damper elements 170 described relative to FIGS. 4-8B. Notably, damper elements 370 include head member 172 having at least partially ramped surface 174 and plurality of flexible legs 180 extending from head member 172. In contrast to damper elements 170 (FIGS. 4-8B), damper elements 370 include an opening 390 defined through a center of head member 172, and an elongated body 392 extending through opening 390 in head member 172. As shown in FIG. 14, head member 172 of each damper element 370 has ramped surface 174 having a frustoconical shape through which opening 390 extends. Other shapes for head member 172 are also possible.

Opening 390 and elongated body 392 can have any mating cross-sectional shape such as circular (as shown in, e.g., FIG. 14), oblong or oval, polygonal, etc. A single elongated body 392 can extend through each damper element 370 in a stack of damper elements 370 in vibration dampening system 320. Elongated body 392 is configured to resonate at a same frequency as rotating blade 114, whereby elongated body 392 generates a force against damper element(s) 370. Elongated body 392 can be configured to resonate at the same frequency as rotating blade 114 by controlling, among other factors, its mass, flex, hardness, diameter and length. Elongated body 392 slides freely in opening 390 but has close clearance therewith such that movement of elongated body 392 caused by vibration of blade 114 will physically impact an inside of opening 390, causing the respective damper element 370 to move. In this manner, elongated body 392 can reduce the likelihood that damper element(s) 370 becoming stuck against inner surface 162 of body opening 160 or to each other.

Vibration dampening system 320 can include just stacked damper elements 370, similar to the arrangements shown in FIGS. 4 and 5 for damper elements 170. In other embodiments, as shown in FIGS. 12 and 13, vibration dampening system 320 may further include a radially outer retainer element 330 fixed to elongated body 392 to retain plurality of stacked damper elements 370 on elongated body 392. Radially outer retainer element 330 can take a variety of forms. In one example, shown in FIG. 12, radially outer retainer element 330 may include an end section 332 configured to abut radially outer end 210 of body opening 160, i.e., end of body opening 160 with or without closure member 166 (FIG. 13), during use. Radially outer retainer element 330 may also include a radially inner end 334 have a shape corresponding to head member 172 of a radially outermost damper element 370X. More particularly, as shown in FIG. 12, where plurality of flexible legs 180 extend radially outward from a respective head member 172 of each of the plurality of damper elements 370, radially inner end 334 of radially outer retainer element 330 has a shape to engage or receive head member 172 of radially outermost damper element 370X. For example, radially inner end 334 of radially outer retainer element 330 may have a planar surface to engage head member 172 or it may have a trapezoidal concave cross-section (shown) to (complementarily) receive a matching head member 172. Where head members 172 have a different shape, radially inner end 334 of radially outer retainer element 330 may be complementarily shaped. In FIG. 13, where plurality of flexible legs 180 extend radially outward from a respective head member 172 of each of the plurality of damper elements 370, radially inner end 334 of radially outer retainer element 330 has a shape similar to head member 172 of radially outermost damper element 370X, i.e., with a frustoconical shape to force flexible legs 180 of radially outermost damper element 370X into frictional engagement with inner surface 162 of body opening 160. Where head members 172 have a different shape, radially inner end 334 of radially outer retainer element 330 may be complementarily shaped.

As also shown in FIGS. 12 and 13, vibration dampening system 320 may further include a radially inner end element 340 slidably connected to elongated body 392 to apply additional centrifugal force to plurality of stacked damper elements 370 on elongated body 392. As shown in FIG. 12, where flexible legs 180 extend radially inward from a respective head member 172 of each of the plurality of damper elements 370, radially inner end element 340 may include a radially outer end (head member) 342 having an at least partially ramped surface 344 configured to engage inner end surfaces 188 (FIGS. 15A-B) of the plurality of flexible legs 180 (FIGS. 15A-B) of a radially innermost one 370I of stacked damper elements 370, and an opening 346 through radially inner end element 340 through which elongated body 392 extends. Radially inner end element 340 is slidable on elongated body 392, i.e., to apply additional centrifugal force to stacked damper elements 370. A radially inner end 348 of radially inner end element 340 may have any shape to abut radially inner end 206 of body opening 160 in an inoperative state of blade 114, i.e., with or without closure member 164 (FIG. 12).

As shown in FIG. 13, where flexible legs 180 extend radially outward from a respective head member 172 (FIGS. 15A-B) of each of damper elements 370, radially inner end element 340 may be configured to engage head member 172 (FIG. 14) of radially innermost one 370I of stacked damper elements 370. For example, radially outer end 342 of radially inner end element 340 may have planar surface to engage head member 172 or it may have a trapezoidal concave cross-section (shown) to (complementarily) receive a matching head member 172. Radially inner end element 340 also includes an opening 346 through which elongated body 392 extends. Radially inner end element 340 is slidable on elongated body 392, i.e., to apply additional centrifugal force to stacked damper elements 370. In FIG. 13, radially inner end 348 of radially inner end element 340 may have any shape to abut radially inner end 206 of body opening 160 in an inoperative state of blade 114, i.e., with or without closure member 164 (FIG. 12).

Vibration dampening system 320 for rotating blade 114 includes a plurality of stacked damper elements 370 for positioning in body opening 160 defined in rotating blade 114. As noted, each damper element 370 includes head member 172 having an at least partially ramped surface 174 and opening 390 defined through a center of head member 172. Plurality of flexible legs 180 extend from head member 172, and elongated body 392 extends through opening 390 in head member 172 of each of damper elements 370. Other aspects of vibration dampening system 320 may be arranged as described relative to vibration dampening system 120 (FIGS. 4, 5, 7A-8B).

In certain embodiments, where damper elements 370 within the stack are identical, they can all react in the same manner, e.g., have flexible legs 180 spring outwardly, simultaneously or in sequence within the stack. However, in other embodiments, two or more damper elements 370 can be customized to react in different manners. In this case, plurality of damper elements 370 have at least one of the following characteristics different between at least two damper elements: overall mass, overall radial length, radial length of the plurality of flexible legs, a force required to flex the plurality of flexible legs outwardly, a shape of the inner end surfaces, a shape of the outer end surfaces, an angle of the at least partially ramped surfaces. In this manner, different damper elements 370 may be activated into frictional dampening in different circumstances. For example, one or more damper elements 370 may be activated under a first centrifugal force CF1 (not shown in drawings) at a first predetermined rotational speed ω1 of rotating blade 114, and one or more different damper elements 370 may be activated under a second centrifugal force CF2 (different than first centrifugal force CF1) at a second predetermined rotational speed ω2 (different than first predetermined rotational speed ω1) of rotating blade 114. As those with skill in the art will recognize, a large number of different characteristics and different damper elements 370 can be used to provide customized vibration dampening, e.g., at different centrifugal forces, different radii along blade 114, among other operational parameters.

In operation, stacked damper elements 370 each provide flexible legs 180 that will expand to frictionally engage inner surface 162 of body opening 160. As noted, damper elements 370 can be customized in a number of ways to expand and frictionally engage at different operational parameters. Stacked damper elements 370 are more likely to capture relative motion because they are forced to expand and touch inner surface 162 of body opening 160 of blade 114. This arrangement is advantageous because it not only allows for damper elements 370 to move immediately with body opening 160 in blade 114, but the sliding between adjacent damper elements 370 creates a stick-slip motion that is also effective for vibration dampening. Elongated body 392 reduces the likelihood that damper element(s) 370 becoming stuck against inner surface 162 of body opening 160 or to each other.

Damper elements 170, 370 can be formed using any now known or later developed manufacturing process, e.g., casting. In certain preferred embodiments, damper elements 170, 370 may be additively manufactured from any material capable of withstanding the environment in which used, including but not limited to cobalt-chrome. Damper elements 170, 370, elongated body 392, and the variety of end elements 200, 220, 330, 340 can be made of any material having sufficient strength, flexibility and durability for their stated function and environment within blade 114.

Embodiments of the disclosure provide various technical and commercial advantages, examples of which are discussed herein. The damper element(s) and vibration dampening system with the damper elements are more likely to capture relative motion because they are forced to expand and touch the inner surface of the body opening in the rotating blade. The various arrangements described herein are advantageous because they not only allow for the damper element(s) to move with the inner surface of the body opening in the rotating blade immediately, i.e., when centrifugal forces do not expand the flexible legs, but the sliding from unloaded flexible legs to loaded, flexed legs create a stick-slip motion that is effective for vibration dampening. The vibration dampening system also reduces blade vibration with a simple arrangement and does not add much extra mass to the blade. Hence, the vibration dampening system and damper elements do not appreciably increase overall centrifugal force to the blade tip end or require a change in blade configuration.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise. "Approximately" or "about," as applied to a particular value of a range, applies to both end values and, unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application and to enable others of ordinary skill in the art to understand the disclosure for various embodiments with various modifications as are suited to the particular use contemplated.

What is claimed is:

1. A damper element for a vibration dampening system in a body opening in a rotating blade in a turbine, the damper element comprising:
   a head member having an at least partially ramped surface and an opening defined through a center of the head member;
   a plurality of flexible legs extending from the head member, wherein each flexible leg includes a radially extending body section having an end section, the end section having an outer end surface and an inner end surface; and
   an elongated body extending through the opening in the head member.

2. The damper element of claim 1, wherein the elongated body is configured to resonate at a same frequency as the rotating blade, whereby the elongated body generates a force against the damper element.

3. The damper element of claim 1, wherein the at least partially ramped surface has an angle in a range between 25° and 55° degrees relative to an inner surface of the body opening, and the inner end surfaces of the plurality of flexible legs have an angle in a range between 25° and 55° degrees relative to the inner surface of the body opening.

4. The damper element of claim 1, wherein the head member and, collectively, the radially extending body sections of the plurality of flexible legs have a first outer diameter, and the outer end surfaces of the plurality of flexible legs collectively define a second outer diameter that is larger than the first outer diameter.

5. The damper element of claim 4, wherein the body opening has an inner surface having a third inner diameter, and wherein the second outer diameter is smaller than the third inner diameter, whereby, in a relaxed state, the plurality of flexible legs pass freely within the body opening.

6. The damper element of claim 4, wherein the inner end surfaces of the plurality of flexible legs are configured to receive an at least partially ramped surface of a head member of an adjacent damper element,
   wherein under influence of a centrifugal force caused by rotation of the rotating blade at higher than a predefined rotational speed, the head member of the adjacent damper element forces the outer end surfaces of the plurality of flexible legs into frictional engagement with an inner surface of the body opening to dampen vibration.

7. The damper element of claim 6, wherein the outer end surfaces of each flexible leg frictionally engage with the inner surface of the body opening at a line.

8. The damper element of claim 1, wherein adjacent radially extending body sections of the plurality of flexible legs define a slot therebetween having a rounded radially outer extent.

9. The damper element of claim 1, wherein the head member has the at least partially ramped surface having a frustoconical shape through which the opening extends.

10. A vibration dampening system for a rotating blade, the vibration dampening system comprising:
    a plurality of stacked damper elements for positioning in a body opening defined in the rotating blade, each damper element including:
    a head member having an at least partially ramped surface and an opening defined through a center of the head member;
    a plurality of flexible legs extending from the head member, wherein each flexible leg includes a radially extending body section having an end section, the end section having an outer end surface and an inner end surface; and
    an elongated body extending through the opening in the head member of each of the plurality of damper elements.

11. The vibration dampening system of claim 10, wherein the at least partially ramped surface of each damper element has an angle in a range between 25° and 55° degrees relative to an inner surface of the body opening, and the inner end surfaces of the plurality of flexible legs have an angle in a range between 25° and 55° degrees relative to the inner surface of the body opening.

12. The vibration dampening system of claim 10, wherein the head member and, collectively, the radially extending body sections of the plurality of flexible legs of each damper element have a first outer diameter, and the outer end surfaces of the plurality of flexible legs of each damper element collectively define a second outer diameter that is larger than the first outer diameter.

13. The vibration dampening system of claim 12, wherein the body opening has an inner surface having a third inner diameter, and wherein the second outer diameter is smaller than the third inner diameter, whereby, in a relaxed state, the plurality of flexible legs of each damper element pass freely within the body opening.

14. The vibration dampening system of claim 12, wherein the inner end surfaces of the plurality of flexible legs of each damper element are configured to receive the at least partially ramped surface of the head member of an adjacent damper element of the plurality of stacked damper elements,
    wherein under influence of a centrifugal force caused by rotation of the rotating blade at higher than a predefined rotational speed, the head member of the adjacent damper element forces the outer end surfaces of the plurality of flexible legs into frictional engagement with an inner surface of the body opening to dampen vibration.

15. The vibration dampening system of claim 14, wherein the outer end surfaces of each flexible leg frictionally engage with the inner surface of the body opening at a line.

16. The vibration dampening system of claim 10, wherein adjacent radially extending body sections of the plurality of flexible legs of each damper element define a slot therebetween having a rounded radially outer extent.

17. The vibration dampening system of claim 10, further comprising a radially outer retainer element fixed to the elongated body to retain the plurality of stacked damper elements on the elongated body.

18. The vibration dampening system of claim 10, wherein the plurality of flexible legs extend radially inward from a respective head member of each of the plurality of damper elements, and further comprising a radially inner end element having:
 a head member having an at least partially ramped surface configured to engage the inner end surfaces of the plurality of flexible legs of a radially innermost one of the plurality of stacked damper elements, and
 an opening through the radially inner end element through which the elongated body extends, wherein the radially inner end element is slidable on the elongated body.

19. The vibration dampening system of claim 10, wherein the plurality of flexible legs extend radially outward from a respective head member of each of the plurality of damper elements, and further comprising a radially inner end element configured to engage the head member of a radially innermost one of the plurality of stacked damper elements, the radially inner end element including an opening through which the elongated body extends, wherein the radially inner end element is slidable on the elongated body.

20. The vibration dampening system of claim 10, wherein the plurality of damper elements have at least one of the following characteristics different between at least two damper elements: overall mass, overall radial length, radial length of the plurality of flexible legs, a force required to flex the plurality of flexible legs outwardly, a shape of the inner end surfaces, a shape of the outer end surfaces, an angle of the at least partially ramped surfaces.

21. The vibration dampening system of claim 10, wherein the head member of each damper element has the at least partially ramped surface having a frustoconical shape through which the opening extends.

* * * * *